United States Patent
Miyazaki et al.

(10) Patent No.: US 10,397,436 B2
(45) Date of Patent: Aug. 27, 2019

(54) IMAGE PICKUP APPARATUS AND IMAGE PICKUP METHOD OF IMAGE PICKUP APPARATUS

(71) Applicant: Olympus Corporation, Hachioji-shi, Tokyo (JP)

(72) Inventors: Satoshi Miyazaki, Tokyo (JP); Keiji Kunishige, Hachioji (JP)

(73) Assignee: Olympus Corportion, Tokyo (JP)

( * ) Notice: Subject to any disclaimer, the term of this patent is extended or adjusted under 35 U.S.C. 154(b) by 56 days.

(21) Appl. No.: 15/705,259

(22) Filed: Sep. 15, 2017

(65) Prior Publication Data

US 2018/0084137 A1    Mar. 22, 2018

(30) Foreign Application Priority Data

Sep. 16, 2016 (JP) .................................. 2016-182016

(51) Int. Cl.
*H04N 1/21* (2006.01)
*H04N 5/232* (2006.01)
*H04N 101/00* (2006.01)

(52) U.S. Cl.
CPC ....... *H04N 1/2145* (2013.01); *H04N 5/23229* (2013.01); *H04N 5/23293* (2013.01); *H04N 2101/00* (2013.01)

(58) Field of Classification Search
CPC ............. H04N 1/2145; H04N 5/23229; H04N 5/23293; H04N 2101/00
See application file for complete search history.

(56) References Cited

U.S. PATENT DOCUMENTS

| 2008/0151070 A1* | 6/2008 | Shiozawa | .......... H04N 5/23293 348/222.1 |
| 2015/0237343 A1* | 8/2015 | Shiohara | ............... H04N 17/002 348/181 |
| 2016/0050352 A1* | 2/2016 | Guo | .................... H04N 5/23216 348/333.02 |
| 2016/0241775 A1* | 8/2016 | Fukuda | .................. G03B 13/36 |

FOREIGN PATENT DOCUMENTS

| JP | 03-213069 | 9/1991 |
| JP | 2001-257976 | 9/2001 |

\* cited by examiner

*Primary Examiner* — Shahbaz Nazrul
(74) *Attorney, Agent, or Firm* — John C. Pokotylo; Pokotylo Patent Services

(57) ABSTRACT

An image pickup apparatus includes a signal output section configured to output a first signal according to first operation and output a second signal according to a second operation, a first image pickup section configured to continue to receive the first signal and continuously perform image pickup of a plurality of images until receiving the second signal, a second image pickup section configured to receive the second signal and perform image pickup, an image selecting section configured to select, out of the plurality of images picked up by the first image pickup section, a desired image different from an image immediately after the reception of the second signal among images picked up by the second image pickup section, and a measuring section configured to measure a time period or a number of images from the image immediately the second signal to the desired image.

19 Claims, 13 Drawing Sheets

FIG. 6

|  |  | M_BLK | |
|---|---|---|---|
|  |  | 0 | 1 |
| M_SND | 0 | NO SOUND<br>NO BLACKOUT | NO SOUND<br>THERE IS BLACKOUT |
|  | 1 | THERE IS SOUND<br>NO BLACKOUT | THERE IS SOUND<br>THERE IS BLACKOUT |

IMAGE PICKUP APPARATUS AND IMAGE PICKUP METHOD OF IMAGE PICKUP APPARATUS

CROSS REFERENCE TO RELATED APPLICATION

This application claims the benefit of Japanese Application No. 2016-182016 filed in Japan on Sep. 16, 2016, the contents of which are incorporated herein by this reference.

BACKGROUND OF THE INVENTION

1. Field of the Invention

The present invention relates to an image pickup apparatus and an image pickup method of the image pickup apparatus capable of measuring a delay of operation on an operation member for acquiring a desired image.

2. Description of the Related Art

An image pickup apparatus such as a digital camera has been generally put to practical use and popularized. The image pickup apparatus includes a live view function for sequentially converting, using an image pickup device and the like, optical images formed by an image pickup optical system into image signals and sequentially continuously displaying, using an image display apparatus, images based on the image signals acquired by the conversion, the image pickup apparatus including a recording function for, when an image pickup instruction signal is generated, acquiring an image signal at a point in time of the generation of the instruction signal or in a predetermined period before and after the point in time, converting the image signal into image data for storage, and recording the image data for storage in a storage medium and, on the other hand, including a reproducing function capable of, when a reproduction instruction signal is generated, converting the image data recorded in the storage medium into an image signal and reproducing and displaying an image based on the image signal using the image display apparatus.

In general, the image pickup apparatus of this type has been configured to start an image pickup operation when a user operates a predetermined operation member. In this case, it is known that a slight temporal delay (time lag) occurs between timing when the user performs image pickup start operation and timing when the image pickup apparatus actually starts the image pickup operation.

When an image of a moving object (a moving body) is picked up, it is also known that a slight temporal delay (time lag) occurs between timing when the user desires the image pickup and timing when the user actually performs the image pickup start operation. A temporal generation delay (time lag) of a release signal caused by the apparatus or the user in this way is referred to as release time lag in the following explanation.

Therefore, for example, Japanese Patent Application Laid-Open Publication No. H3-213069, Japanese Patent Application Laid-Open Publication No. 2001-257976, and the like have made various proposals of disclose various image pickup apparatuses configured to make it possible to easily acquire a desired image taking into account the release time lag that occurs during the image pickup operation.

For example, the image pickup apparatus disclosed by Japanese Patent Application Laid-Open Publication No. H3-213069 and the like includes image pickup means, a buffer memory, release-signal generating means, and preliminary image pickup means. Among image signals acquired by the image pickup means before release signal generation, image signals after the operation of the preliminary image pickup means is started are stored in the buffer memory. According to generation of a release signal, image signals equivalent to at least one screen or more among the image signals recorded in the buffer memory are recorded in a recording medium.

In the image pickup apparatus disclosed by Japanese Patent Application Laid-Open Publication No. 2001-257976 and the like, when an image pickup operation is started by a first release, storage of an acquired image signal in a buffer memory (an internal memory) is started. When a following second release is performed, an image signal at generation timing of a second release signal of the second release is recorded in a recording medium (a memory card) as a reference image and post frames of the reference image and subsequent images and pre-frames stored in the buffer memory before the second release signal are recorded in the memory card. In this way, a plurality of image signals before and after the generation of the second release signal, which is the execution of the image pickup operation, are recorded in the recording medium (the memory card).

That is, in the image pickup apparatuses in the past disclosed by Japanese Patent Application Laid-Open Publication No. H3-213069, Japanese Patent Application Laid-Open Publication No. 2001-257976, and the like, it is possible to record, on the basis of a point in time of the generation of the release signal (the second release signal), image signals of a predetermined number of frames before the point in time or before and after the point in time in the recording medium.

SUMMARY OF THE INVENTION

An image pickup apparatus according to an aspect of the present invention includes: a signal output section configured to output a first signal according to first operation by an operator and output a second signal according to a further second operation following the first operation; a first image pickup section configured to continue to receive the first signal and continuously perform image pickup of a plurality of images until receiving the second signal; a second image pickup section configured to receive the second signal outputted according to the second operation and perform image pickup following the image pickup by the first image pickup section; an image selecting section configured to select, out of the plurality of images picked up by the first image pickup section, a desired image different from an image immediately after the reception of the second signal among images picked up by the second image pickup section; and a measuring section configured to measure a time period or a number of images from the image immediately after the reception of the second signal to the desired image.

An image pickup apparatus according to another aspect of the present invention includes: an operation member configured to receive operation by an operator; a signal output section configured to receive first operation by the operator on the operation member, output a first signal receiving the first operation, and output a second signal receiving a further second operation by the operator following the first operation; a display section configured to perform display for instructing the operator to perform operation on the operation member; and a clocking section configured to perform clocking from a start of the display by the display section to a point in time when the operation member is operated.

An image pickup apparatus according to still another aspect of the present invention includes: a display section configured to perform image display; a signal output section configured to output a first signal according to first operation by an operator and output a second signal according to a further second operation following the first operation; a first image pickup section configured to continue to receive the first signal and continuously perform image pickup of a plurality of images until receiving the second signal; a second image pickup section configured to receive the second signal and perform image pickup of at least a single image; an image selecting section with which the operator selects a desired image out of the plurality of images picked up by the first image pickup section; a measuring section configured to retroactively measure a time period or a number of images from the image acquired by the second image pickup section to the selected desired image; a measurement-result storing section configured to store a result acquired by the measuring section; an image pickup measurement mode section configured to cause the measuring section and the measurement-result storing section to act on the basis of the image selected by the image selecting section by performing the image pickup and the image pickup by the second image pickup section and selecting by the first image pickup section; and a control section configured to automatically select a predetermined image on the basis of a measurement result acquired by the image pickup measurement mode section and perform control for causing the display section to display the selected image.

An image pickup apparatus according to still another aspect of the present invention includes: a display section configured to perform image display; a signal output section including an operation member and configured to output a first signal according to first operation by an operator on the operation member and output a second signal according to a further second operation by the operator on the operation member following the first operation; a first image pickup section configured to continue to receive the first signal and continuously perform image pickup of a plurality of images until receiving the second signal; a second image pickup section configured to receive the second signal outputted according to the second operation for acquiring a desired image and perform image pickup of at least a single image; an operation-delay measuring section configured to, in order to measure a delay of operation on the operation member with respect to the second operation for acquiring the desired image, perform, on the display section, first display for urging preparation operation on the operation member, perform second display for instructing the second operation for not performing image pickup, when the second operation is performed, measure a time period from the second display to the second operation, and store the measured time period; and a control section configured to perform control pick up a plurality of images by the first image pickup section, perform image pickup by the second image pickup section, and display an image retroactive in a direction of a first image of the plurality of images picked up by the image pickup section from a second image picked up according to a start of the image pickup by the second image pickup section by the time period measured by the operation-delay measuring section or a number of picked-up images equivalent to the measured time period.

An image pickup method of an image pickup apparatus according to an aspect of the present invention includes: outputting a first signal according to first operation by an operator and outputting a second signal according to a further second operation following the first operation; continuing to receive the first signal and continuously performing image pickup of a plurality of images until the second signal is received; receiving the second signal outputted according to the second operation and perform image pickup following the image pickup; selecting, out of the plurality of images picked up according to the first signal, a desired image different from an image immediately after the reception of the second signal among the images picked up; and measuring a time period or a number of images from the image immediately after the reception of the second image to the desired image.

An image pickup method of an image pickup apparatus according to another aspect of the present invention includes: receiving first operation by an operator on an operation member and outputting a first signal according to the first operation; outputting a second signal according to a further second operation by the operator following the first operation; performing display for instructing the operator to perform operation on the operation member; and performing clocking from a start of the display to a point in time when the operation member is operated.

An image pickup method of an image pickup apparatus according to still another aspect of the present invention includes: outputting a first signal according to first operation by an operator and outputting a second signal according to a further second operation following the first operation; continuing to receive the first signal and continuously performing image pickup of a plurality of images until the second signal is received; receiving the second signal and performing image pickup of at least a single image; the operator selecting a desired image out of the plurality of images acquired by receiving the first signal; retroactively measuring a time period or a number of images from the single image acquired by receiving the second image to the selected desired image; storing the time period or the number of images; automatically selecting a desired image on the basis of the time period or the number of images; and making the selected image be displayed.

An image pickup method of an image pickup apparatus according to still another aspect of the present invention includes: outputting a first signal according to first operation by an operator on an operation member; outputting a second signal according to a further second operation by the operator on the operation member following the first operation; continuing to receive the first signal and continuously performing image pickup of a plurality of images until the second signal is received; receiving the second signal outputted according to the second operation for acquiring a desired image and performing image pickup of at least a single image; in order to measure a delay of operation on the operation member with respect to the second operation for acquiring the desired image, performing first display for urging preparation operation on the operation member; performing second display for instructing the second operation for not performing image pickup; when the second operation is performed, measuring a time period from the second display to the second operation; storing the measured time period; and receiving the first signal, starting image pickup of a plurality of images, and displaying an image retroactive in a direction of a first image of the plurality of images from a second image picked up according to the second signal by the measured time period or a number of picked-up images equivalent to the measured time period.

Advantages of these inventions will be further clarified from the following detailed explanation.

BRIEF DESCRIPTION OF THE DRAWINGS

FIG. 6 is a table showing a combination example of setting modes for notifying a recording operation status to a user concerning a recording operation during execution of an image pickup operation of the image pickup apparatus shown in FIG. 1;

DETAILED DESCRIPTION OF THE PREFERRED EMBODIMENTS

The present invention is explained below according to an embodiment shown in the figures. Respective drawings used in the following explanation are schematically shown. In order to show respective components in sizes recognizable on the drawings, dimensional relations, scales, and the like of respective members are sometimes shown differently for each of the respective components. Therefore, the present invention is not limited to only forms shown in the figures concerning the numbers of the respective components described in the respective drawings, the shapes of the respective components, ratios of the sizes of the respective components, relative positional relations among the respective components, and the like.

In an embodiment of the present invention, an image pickup apparatus (e.g., a digital camera or a video camera) including a live view function for sequentially photoelectrically converting, using an image pickup device (e.g., a photoelectric conversion device such as a CCD (charge coupled device) image sensor or a CMOS (complementary metal oxide semiconductor) image sensor), optical images formed by an image pickup optical system to acquire image signals and sequentially continuously displaying, using an image display apparatus (e.g., a liquid crystal display (LCD) or an organic electro-luminescence (OEL) display), images based on the image signals acquired by the photoelectric conversion, the image pickup apparatus including a recording function for, when an image pickup instruction signal is generated, acquiring an image signal at a point in time of the generation of the instruction signal or in a predetermined period before and after the point in time, converting the image signal into image data for storage (e.g., digital image data representing a still image or a movie), and recording the image data for storage in a storage medium and, on the other hand, including a reproducing function capable of, when a reproduction instruction signal is generated, converting the image data recorded in the storage medium into an image signal and reproducing and displaying an image (e.g., a still image or a movie) based on the image signal using the image display apparatus.

Figure 1:
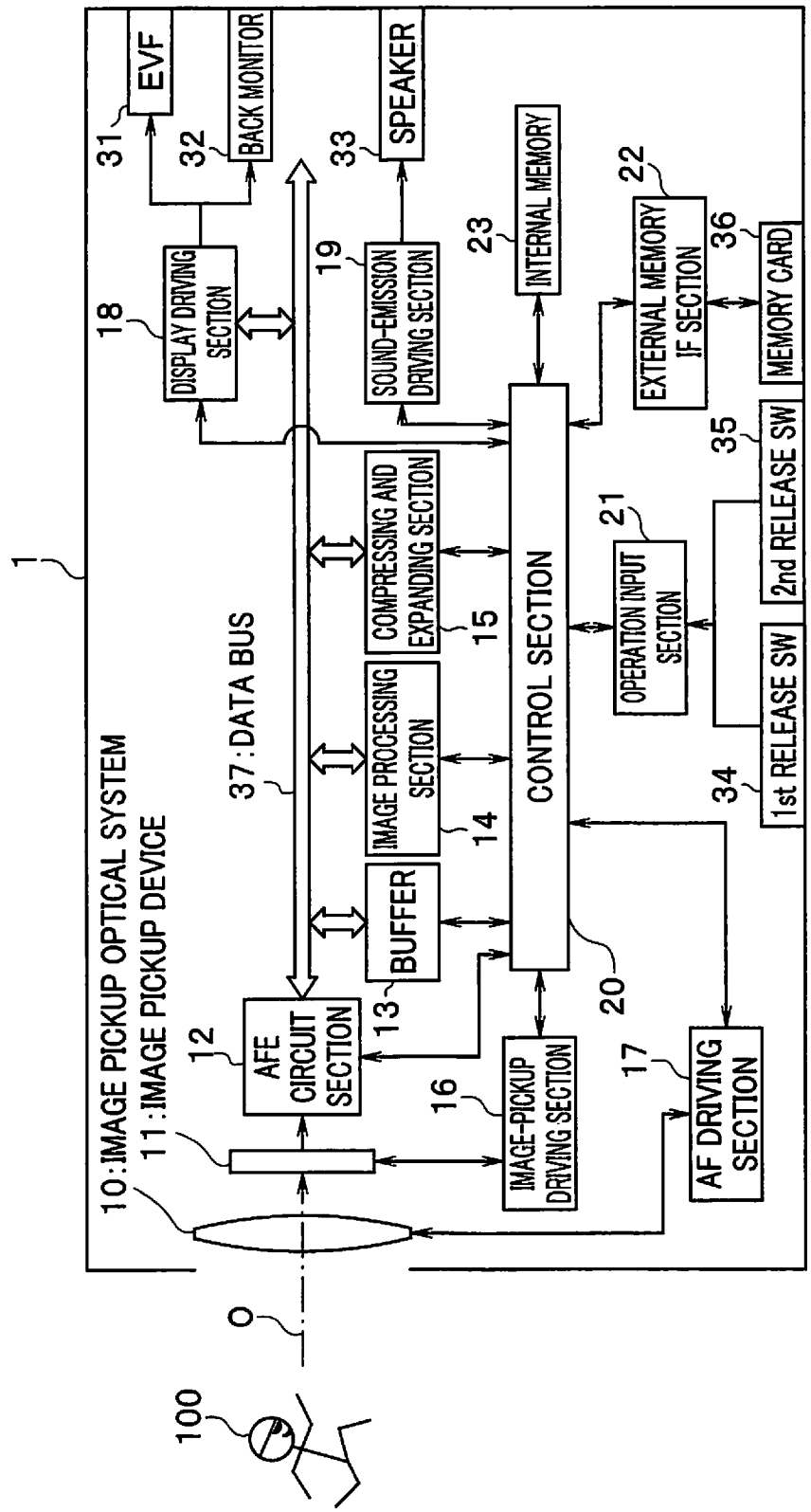
FIG. 1 is a block configuration diagram showing a schematic configuration of an image pickup apparatus according to an embodiment of the present invention.

First, a schematic configuration of the image pickup apparatus according to the embodiment of the present invention is explained below with reference to FIG. 1. FIG. 1 is a block configuration diagram showing the schematic configuration of the image pickup apparatus according to the embodiment of the present invention.

An image pickup apparatus 1 according to the present embodiment mainly includes, as shown in FIG. 1, an image pickup optical system 10, an image pickup device 11, an AFE circuit section 12, a buffer memory (in FIG. 1, simply described as buffer) 13, an image processing section 14, a compressing and expanding section 15, an image-pickup driving section 16, an AF driving section 17, a display driving section 18, a sound-emission driving section 19, a control section 20, an operation input section 21, an external memory IF section 22, an internal memory 23, an EVF 31, a back monitor 32, a speaker 33, a first release switch (in FIG. 1, abbreviated as 1st release SW; the same applies below) 34, a second release switch (in FIG. 1, abbreviated as 2nd release SW; the same applies below) 35, and a memory card 36.

Note that, naturally, the image pickup apparatus 1 according to the present embodiment includes various constituent members besides these constituent members. However, in the image pickup apparatus 1 according to the present embodiment, other constituent members other than the constituent members described above are not directly related to the present invention. Therefore, illustration and detailed explanation of the other constituent members are omitted.

The image pickup optical system 10 condenses and transmits lights in a predetermined range including an object 100 to form an optical image including an object image in a predetermined position. The image pickup optical system 10 includes, besides a plurality of optical lenses and a plurality of lens barrels that respectively hold the plurality of optical lenses, a moving mechanism for moving a part of the plurality of lens barrels in a direction along an optical axis O. Illustration and explanation of a unit configuration of the image pickup optical system 10 are omitted.

The image pickup device 11 is image pickup means for receiving optical images including the object 100 formed by the image pickup optical system 10 and sequentially photoelectrically converting the optical images to thereby acquire image signals. As the image pickup device 11, for example, a CCD image sensor including a semiconductor device such as a CCD or a MOS image sensor, which is a solid state image pickup device, including a CMOS is applied. The image pickup device 11 is controlled to be driven by the control section 20 via the image-pickup driving section 16 explained below.

More specifically, the image pickup device 11, which is the image pickup means, according to the first embodiment of the present invention includes, for example, a first image pickup section, which is first image pickup means, configured to continue to receive a 1st release signal (a first signal) and continuously perform image pickup of a plurality of image data until receiving a 2nd release signal (a second signal) and a second image pickup section, which is second image pickup means, configured to receive the 2nd release signal (the second signal) outputted according to 2nd release operation (second operation) and perform image pickup following the image pickup by the first image pickup section.

The AFE (analog front end) circuit section 12 is an analog circuit section interposed between the image pickup device 11 (a signal detecting device) and the control section 20 (a digital signal processing device). The AFE circuit section 12 is an analog circuit section configured to receive an output signal (an analog image signal) outputted from the image pickup device 11 and perform various kinds of pre-processing including digital conversion processing. Note that the AFE circuit section 12 in the present embodiment is connected to the control section 20.

The buffer memory (in FIG. 1, simply described as buffer) 13 is a temporary saving section, which is temporary saving means, configured to temporarily save digital image data pre-processed by the AFE circuit section 12 after being acquired by the image pickup device 11. The buffer memory 13 is a temporary saving section, which is temporary saving means, configured to temporarily save image data processed in the image processing section and the compressing and expanding section 15 and the like explained below. A semiconductor memory such as a RAM (random access memory) is applied to the buffer memory 13.

The image processing section 14 is a circuit section configured to, under the control by the control section 20, read out the image data temporarily saved in the buffer memory 13 and apply various kinds of image processing, for example, image processing required as appropriate such as image enhancement processing and various kinds of correction processing to the image data.

The compressing and expanding section 15 is a circuit section configured to, under the control by the control section 20, read out the image data temporarily saved in the buffer memory 13 and perform, on the image data, data compression processing and data expansion processing by a processing scheme such as JPEG.

The image-pickup driving section 16 is a circuit section configured to receive a control signal generated by the control section 20 and drive and control the image pickup device 11.

The AF driving section 17 is a circuit section configured to receive the control signal generated by the control section 20 and drive and control the image pickup optical system 10. More specifically, the AF driving section 17 is a circuit section for executing an autofocus operation.

The display driving section 18 is a circuit section configured to, under the control by the control section 20, switch a plurality of image display apparatuses (the EVF 31 and the back monitor 32) on the basis of, for example, an output of an eye sensor (not shown in the figure) and control to drive the image display apparatuses. Note that a display section, which is display means, is configured by the display driving section 18, the EVF 31, and the back monitor 32. The display section displays, for example, images based on image data acquired by the image pickup device 11 and acquired through various kinds of image processing and images based on image data stored in the memory card 36 (explained below). Besides, the display section also performs, for example, menu display, setting display, and the like corresponding to a computer program stored in the internal memory 23 (explained below) or the like in advance to perform various settings in the image pickup apparatus 1 and display for instructing the operator to perform operation on an operation member (explained below) during a predetermined setting operation (e.g., a time lag setting operation) or the like.

The EVF (electronic view finder) 31 is a so-called electronic view finder configured by a small display apparatus of an eyepiece type. The back monitor 32 is a small display apparatus provided to direct a display surface of the display apparatus to an outer surface on a main body back side of the image pickup apparatus 1. For example, a small LCD or an organic EL display is applied to both of the EVF 31 and the back monitor 32.

The sound-emission driving section 19 is a circuit section for controlling to drive the speaker 33, which is a sound emission member, under the control by the control section 20. The sound-emission driving section 19 is used for appropriately emitting, for example, besides predetermined warning sound and the like, focusing sound during an autofocus operation and pseudo shutter sound during a shutter operation from the speaker 33.

The control section 20 is controlling means including a circuit section configured to collectively control an entire electric circuit of the image pickup apparatus 1. The control section 20 is configured by a processor such as a CPU (central processing unit). The control section 20 controls respective constituent units of the image pickup apparatus 1 according to, for example, a computer program recorded in advance in the internal memory 23 explained below.

The operation input section 21 is a constituent unit configured by various plural operation members provided on the outer surface of the image pickup apparatus 1, switch members respectively corresponding to the operation members, a circuit section including the switch members, and the like. Operation signals outputted from the respective switch members included in the operation input section 21 are transmitted to the control section 20. The control section 20, which receives the operation signals, is configured to output various control signals to constituent units corresponding to the control signals. As the operation members included in the operation input section 21, more specifically, for example, there are a power ON/OFF button, a menu call button, an operation mode change button, a reproduction button, and a shutter release button.

Note that, in the present embodiment, a shutter release switch (an electric component; not shown in the figure), on which a shutter release button (a mechanical structure component; not shown in the figure) functioning as an operation member acts, is a signal output section, which is signal output means, adopting a two-stage switch member configured by a first release switch (hereinafter described as 1st release SW) 34 to which a first release (hereinafter described as 1 st release) signal is outputted according to pressing operation of a first stage and a second release switch (hereinafter described as 2nd release SW) 35 to which a second release (hereinafter described as 2nd release) signal is further outputted according to continuous pressing.

In this case, operation for outputting the 1st release signal (a first signal) is referred to as 1st release operation (first release operation or first operation). Operation for outputting the second release signal (a second signal) is referred to as 2nd release operation (second release operation or second operation).

The external memory interface section (hereinafter referred to as external memory IF section) 22 is a circuit section configured to control to drive, for example, the memory card 36, which is a storage medium and is an external memory, under the control by the control section 20. The memory card 36 is an external memory configured from a semiconductor memory, which includes a card-shaped housing, and configured to be capable of being inserted into and pulled out from the image pickup apparatus 1. Desired image data of a final form among acquired image data is recorded and saved in the memory card 36.

Note that, in the present embodiment, the external memory IF section 22 and the memory card 36 functioning as the external memory are configured as recording means of a final form. However, the recording means is not limited to this form. Instead of the external memory IF section and the external memory, the recording means may be configured as an incorporated memory of a form fixedly provided on an inside of the image pickup apparatus 1.

The internal memory 23 is a memory in which a computer program and the like to be executed by the control section 20 are stored in advance. Set states such as an operation mode of the image pickup apparatus 1 are stored in the internal memory 23. For example, an image for GUI and the like used for the menu display explained above are stored in the internal memory 23. Note that, as the internal memory 23, for example, a nonvolatile memory such as a flash memory is applied.

Note that, image data acquired by the image pickup device 11 and digitized by the AFE circuit section 12 is transmitted to the buffer memory 13, the image processing section 14, and the compressing and expanding section 15 as appropriate. A data bus 37 is provided as a transmission line for the image data at this point.

Internal constituent units in the image pickup apparatus 1 are connected to one another by a signal line extensively laid on the basis of the control section 20. Therefore, a control signal from the control section 20 and output signals from the respective constituent units to the control section 20 are transmitted between the control section 20 and the respective constituent units via the signal line. Other components not shown in the figure are substantially the same as the components of the image pickup apparatus in the past.

Figure 2:
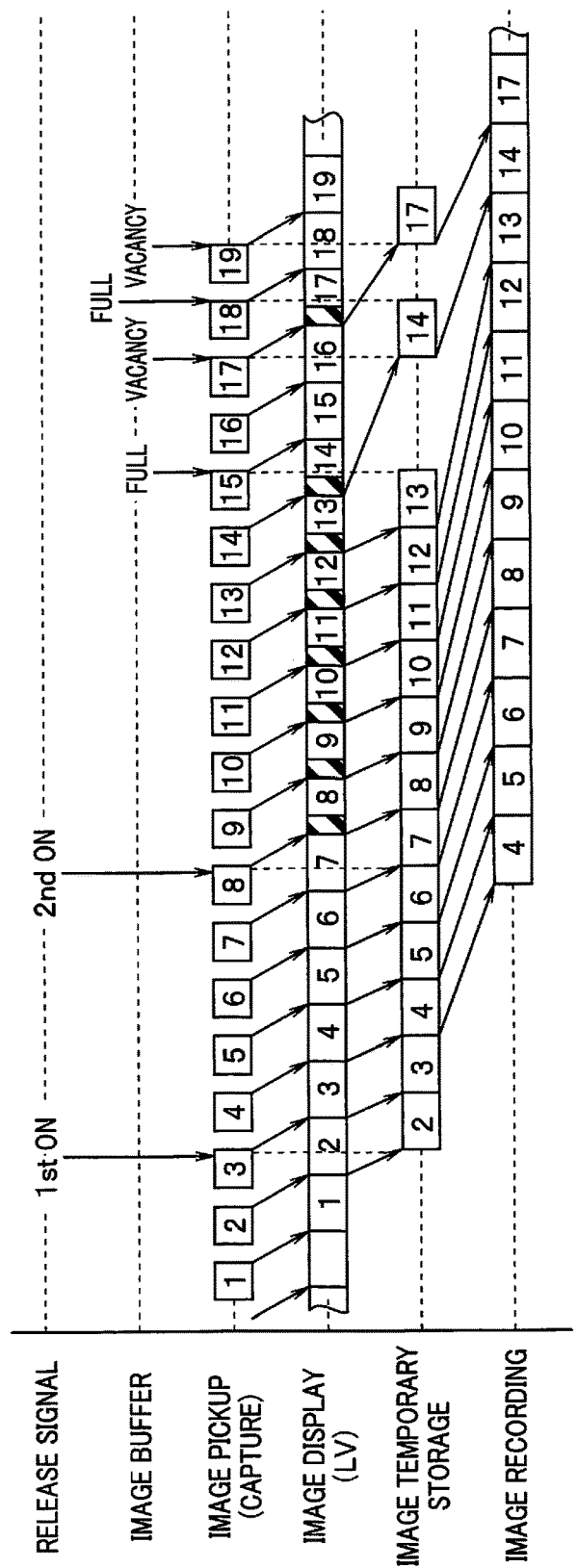
FIG. 2 is a time chart conceptually showing a status of a recording operation of image data executed according to a release signal, the release signal being generated in a state of an image pickup operation mode of the image pickup apparatus shown in FIG. 1.
Figure 3:
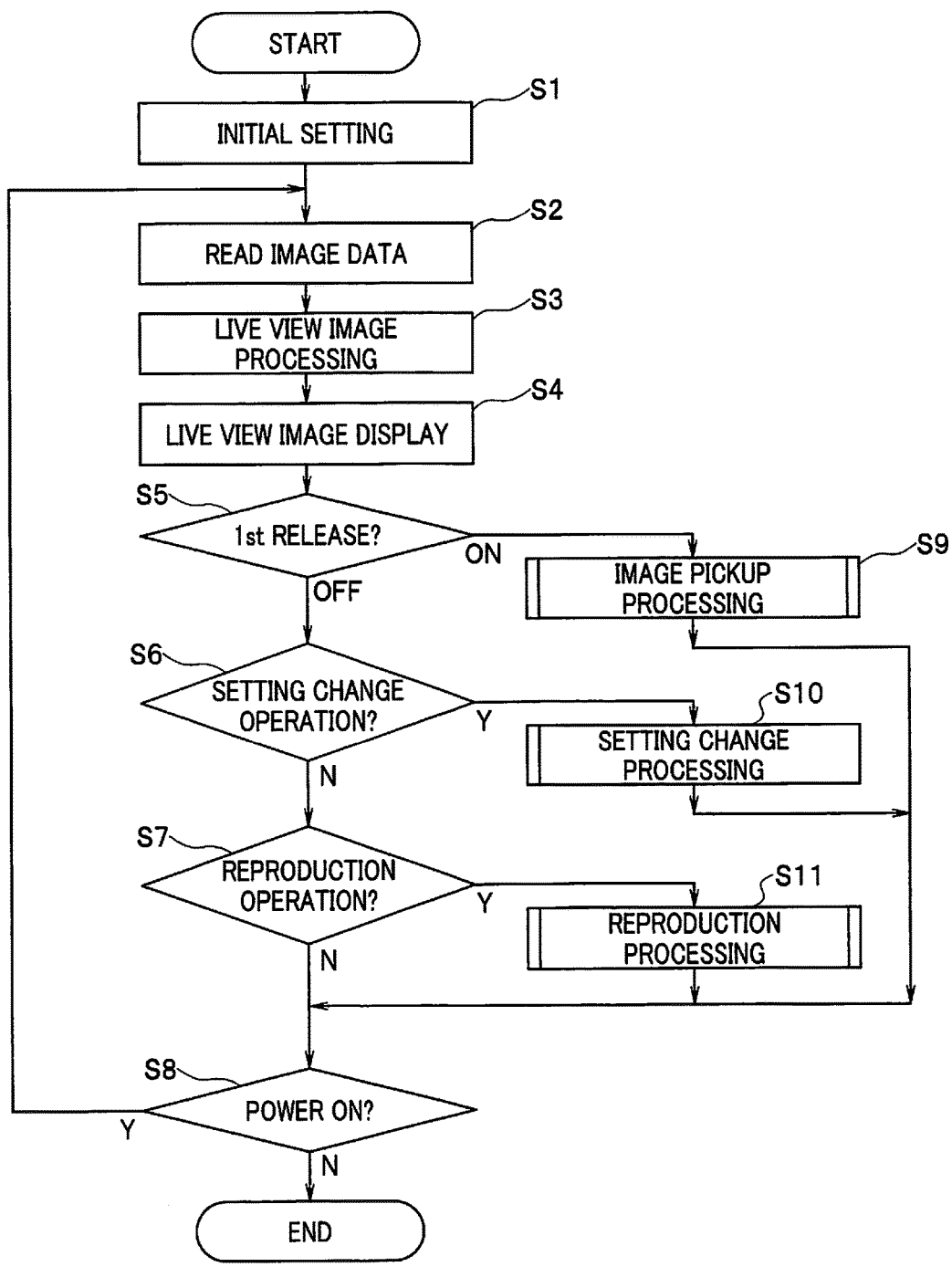
FIG. 3 is a flowchart showing a main sequence of the image pickup apparatus shown in FIG. 1.

Action at the time when an image pickup operation is executed in the image pickup apparatus 1 according to the present embodiment configured as explained above is explained below. FIG. 2 is a time chart conceptually showing a status of a recording operation of image data executed according to a release signal, the release signal being generated in a state of an image pickup operation mode of the image pickup apparatus according to the present embodiment. Note that FIG. 2 basically shows an operation status during a "continuous photographing mode". However, in the following explanation, a behavior during a "single photographing mode" is also explained with reference to FIG. 2 (details are explained below). FIG. 3 is a flowchart showing a main sequence of the image pickup apparatus according to the present embodiment.

First, when the power ON/OFF button (not shown in the figure) of the image pickup apparatus 1 is turn on and the image pickup apparatus 1 starts, the control section 20 reads a predetermined program from the internal memory 23 (the flash memory) and executes the main sequence shown in FIG. 3.

In step S1 in FIG. 3, the control section 20 executes predetermined initial setting processing for the respective constituent units of the image pickup apparatus 1. For example, in the initial setting processing, the control section 20 starts power supply to the respective circuits and sets, in the image pickup apparatus 1, various setting values of specified setting or set by the user in advance. For example, as setting of an operation mode during the start of the image pickup apparatus 1, the control section 20 sets an image pickup operation mode in which the image pickup operation can be performed.

Subsequently, in step S2 in FIG. 3, the control section 20 starts image data reading processing. The image data reading processing is continuously performed for each of image signals continuously acquired by the image pickup device 11.

The image data reading processing is performed by the control section 20 controlling to drive the image pickup device 11 via the image-pickup driving section 16. The image pickup device 11 photoelectrically converts an optical image formed on an image pickup surface (not shown in the figure) to generate an image signal (an analog signal). The image signal generated by the image pickup device 11 is outputted to the AFE circuit section 12. The AFE circuit section 12 performs various kinds of pre-processing including digital conversion processing to generate digital image data. The digital image data generated by the AFE circuit section 12 is outputted to the image processing section 14. The image processing section 14 receives the digital image data and performs, for example, image processing for generating image data for display of a form optimum for display. The image data for display generated by the image processing section 14 is temporarily saved in the buffer memory 13. In the image data reading processing, the series of processing is repeated.

In FIG. 2, each of respective frames (frames with numbers 1, 2, 3, . . . ) shown in a field of "image pickup (capture)" indicates one image data. In the field of the "image pickup (capture)" shown in FIG. 2, a state is shown in which an image pickup (capture) operation is started from the image data with the frame number "1" and, thereafter, image data is continuously acquired.

Simultaneously with the image data reading processing, the control section 20 controls to drive the image pickup optical system 10 via the AF driving section 17 and performs processing for adjusting an object image formed on the image pickup device 11 to be in a focused state while referring to the read image data.

Subsequently, in step S3 in FIG. 3, the control section 20 executes live view image processing. The live view image processing is processing for generating image data for display in the image processing section 14 upon receiving image data acquired by the image pickup device 11 and subjected to pre-processing by the AFE circuit section 12.

In the live view image processing, the control section 20 reads out, in order from oldest one, image data for display temporarily saved in the buffer memory 13 and outputs the image data for display to the display driving section 18. The display driving section 18 receives the image data for display and controls to drive the display apparatus (one of the EVF 31 and the back monitor 32) for display on the basis of an output of the eye sensor (not shown in the figure).

Subsequently, in step S4 in FIG. 3, the control section 20 executes live view image display processing. That is, the control section 20 sequentially outputs the image data for display to the display device (the EVF 31 or the back monitor 32) via the display driving section 18. The corresponding display device (the EVF 31 or the back monitor 32) receives the image data for display and continuously displays images based on the image data for display. In FIG. 2, the series of processing is shown in the field of the "image pickup (capture)" and a field of "image display (LV: live view)". By visually observing the images continuously displayed on the display apparatus (the EVF 31 or the back monitor 32) in this way, the user can visually observe images including the object as a movie.

In step S5 in FIG. 3, the control section 20 monitors the operation input section 21 and confirms whether there is an output (an ON signal) of the 1st release SW 34. If the control section 20 confirms the ON signal of the 1st release SW 34, the control section 20 proceeds to processing of the next step S9, that is, the image pickup processing. Details (subroutines) of the image pickup processing are explained below (see FIGS. 4 to 8). Note that the image pickup processing includes image pickup processing during the single photographing mode for acquiring only one still image and image pickup processing during the continuous photographing mode capable of acquiring a continuous predetermined number of still images. When the image pickup processing is executed, which of the image pickup processing during the single photographing mode and the image pickup processing during the continuous photographing mode is executed depends on setting at that time (specified setting or setting performed by the user in advance).

When the control section 20 returns to the original processing leaving the subroutine of the image pickup processing, thereafter, the control section 20 proceeds to processing in step S8.

Note that, as shown in a field of a "release signal" in FIG. 2, if the ON signal of the 1st release SW 34 is generated at illustrated timing, for example, near a predetermined point in time during acquisition of a capture image with the frame number "3", a temporary saving operation in the buffer memory 13 is started from image data (the frame number "2") corresponding to a display image (the frame number "2") during execution of the "image display (LV)" at a point in time same as a point in time of the generation of the ON signal of the 1st release SW 34. Image data following the image data (the frame number "2") are sequentially temporarily saved.

As explained above, the buffer memory 13 is the temporary saving section, which is the temporary saving means, configured to temporarily save the digital image data pre-processed by the AFE circuit section 12 after being acquired by the image pickup device 11. An internal structure of the buffer memory 13 is configured, for example, as explained below.

It is assumed that the buffer memory 13 in the image pickup apparatus 1 according to the present embodiment includes a region (a first buffer region; not shown in the figure) in which image data acquired by the image pickup device 11 are saved by a predetermined number in order from latest image data while the 1st release SW 34 is kept in the ON state, a region (a second buffer region; not shown in the figure) in which image data acquired after the 2nd release SW 35 is turned on and subsequent image data are saved, and a region (a third buffer region; not shown in the figure) in which image data for recording to be recorded in the memory card 36 is temporarily saved.

That is, the image data acquired by the first image pickup section of the image pickup device 11, which is the image pickup means, is temporarily saved in the first buffer region. The image data acquired by the second image pickup section of the image pickup device 11, which is the image pickup means, is temporarily saved in the second buffer region.

On the other hand, if the control section 20 does not confirm the ON signal of the 1st release SW 34 in step S5 in FIG. 3, that is, if the 1st release SW 34 remains off, the control section 20 proceeds to processing in step S6.

Subsequently, in step S6 in FIG. 3, the control section 20 monitors the operation input section 21 and confirms whether setting change operation, for example, operation of the menu call button or operation of the operation mode change button or the like is performed. If the control section 20 confirms the setting change operation, the control section 20 proceeds to processing in the next step S10, that is, setting change processing. As the setting change processing, setting change processing corresponding to operation content of the operation member by the user is executed. Examples of setting to be changed include, besides shutter speed setting, aperture setting, ISO sensitivity setting, white balance setting, switching setting for the single photographing mode and the continuous photographing mode, and the like, setting of a "black image display mode" and a "sound emission mode" (see FIG. 6), "number-of-frames setting", and "time lag setting" explained below. Details (subroutines) of the "number-of-frames setting" (see FIG. 9) and the "time lag setting" (see FIGS. 11 and 12) in the setting change processing are explained below.

When the control section 20 returns to the original processing leaving the subroutine of the setting change processing, thereafter, the control section 20 proceeds to processing in step S8.

If the control section 20 does not confirm the setting change operation in step S6 in FIG. 3, the control section 20 proceeds to step S7.

In step S7 in FIG. 3, the control section 20 monitors the operation input section 21 and confirms whether reproduction operation, for example, operation of the reproduction button is performed. If the control section 20 confirms the reproduction operation, the control section 20 proceeds to processing in the next step S11, that is, reproduction processing.

In the reproduction processing, for example, besides processing for reading out image data recorded in the memory card 36, which is the external memory, and displaying the image data on the EVF 31 or the back monitor 32, the control section 20 can also perform, for example, processing for erasing unnecessary image data among the recorded image data. Note that details (subroutines) of the reproduction processing include portions not directly related to the present invention. Therefore, explanation of the details is omitted. When the control section 20 returns to the original processing leaving the subroutine of the reproduction processing, thereafter, the control section 20 proceeds to processing in step S8.

In step S8 in FIG. 3, the control section 20 monitors the operation input section 21 and confirms a state of the power ON/OFF button to thereby determine whether the image pickup apparatus 1 is in a power-on state. If the control section 20 confirms that the image pickup apparatus 1 is in the power-on state, the control section 20 returns to the processing in step S2. If the control section 20 confirms that the image pickup apparatus 1 is not in the power-on state, the control section 20 ends the series of processing.

If the control section 20 confirms the ON signal of the 1st release SW 34 in the processing in step S5 in FIG. 3, the control section 20 proceeds to image pickup processing in step S9. In this case, subroutines of the image pickup processing in step S9 include the image pickup processing during the single photographing mode shown in FIGS. 4 and 5 and the image pickup processing during the continuous photographing mode shown in FIGS. 7 and 8. Which of the image processing during the single photographing mode and the image processing during the continuous photographing mode the control section 20 proceeds to in step S9 depends on whether setting in the image pickup apparatus 1 at that time is single photographing mode setting or continuous photographing mode setting.

Figure 4:
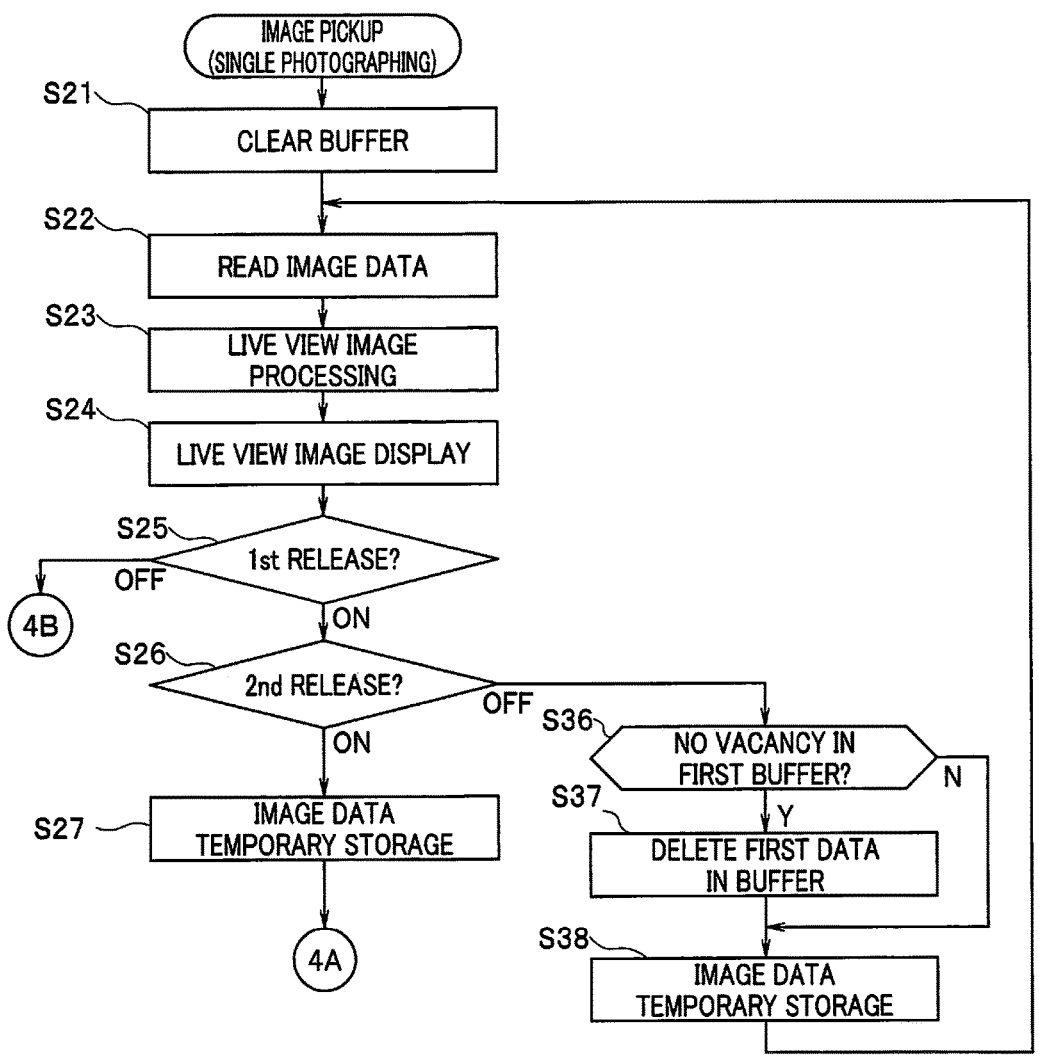
FIG. 4 is a flowchart (a former half) showing a subsequence during a single image pickup operation mode (a single photographing mode) in image pickup processing (image pickup processing in step S9 in FIG. 3) of the image pickup apparatus shown in FIG. 1.
Figure 5:
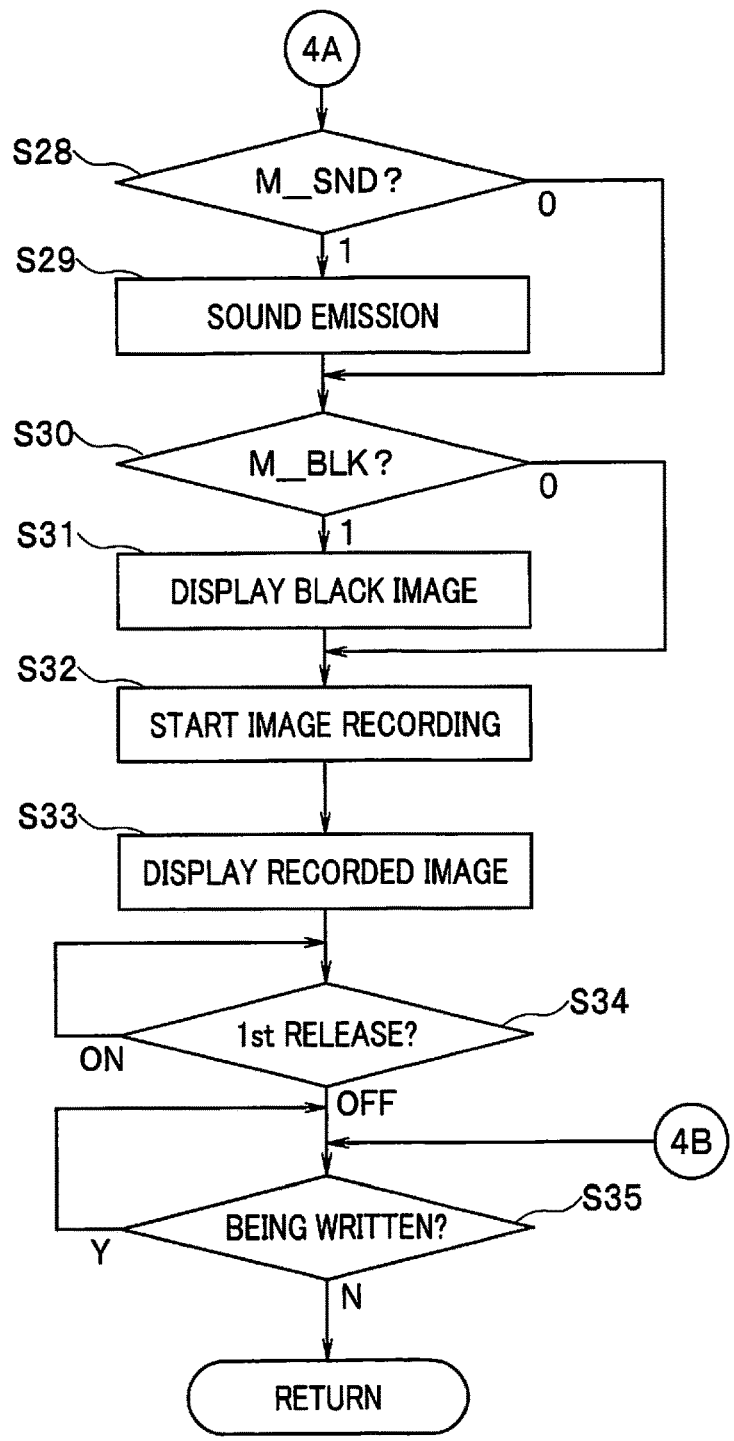
FIG. 5 is the flowchart (a latter half) showing the subsequence during the single image pickup operation mode (the single photographing mode) in the image pickup processing (the image pickup processing in step S9 in FIG. 3) of the image pickup apparatus shown in FIG. 1.

FIGS. 4 and 5 are a flowchart showing a subsequence during an independent image pickup operation mode (so-called single photographing mode) in the image pickup processing (the image pickup processing in step S9 in FIG. 3) of the image pickup apparatus according to the present embodiment. Note that FIG. 4 shows a former half of the flowchart and FIG. 5 shows a latter half of the flowchart.

FIG. 6 is a table showing a combination example of setting modes for notifying a recording operation status to the user concerning a recording operation during execution of the image pickup operation of the image pickup apparatus according to the present embodiment.

Figure 7:
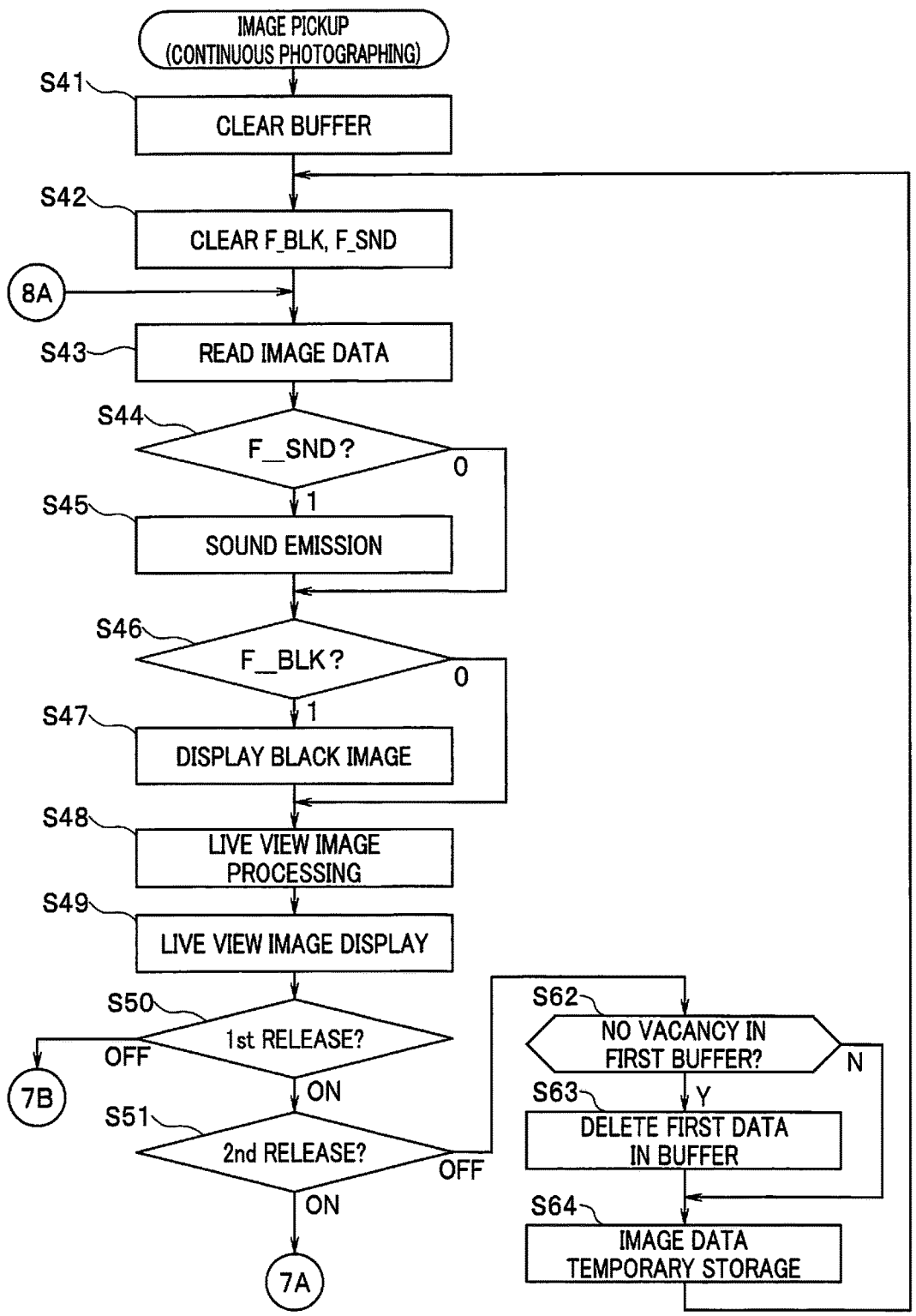
FIG. 7 is a flowchart (a former half) showing a subsequence during a continuous image pickup operation mode (a continuous photographing mode) in the image pickup processing (the image pickup processing in step S9 in FIG. 3) of the image pickup apparatus shown in FIG. 1.
Figure 8:
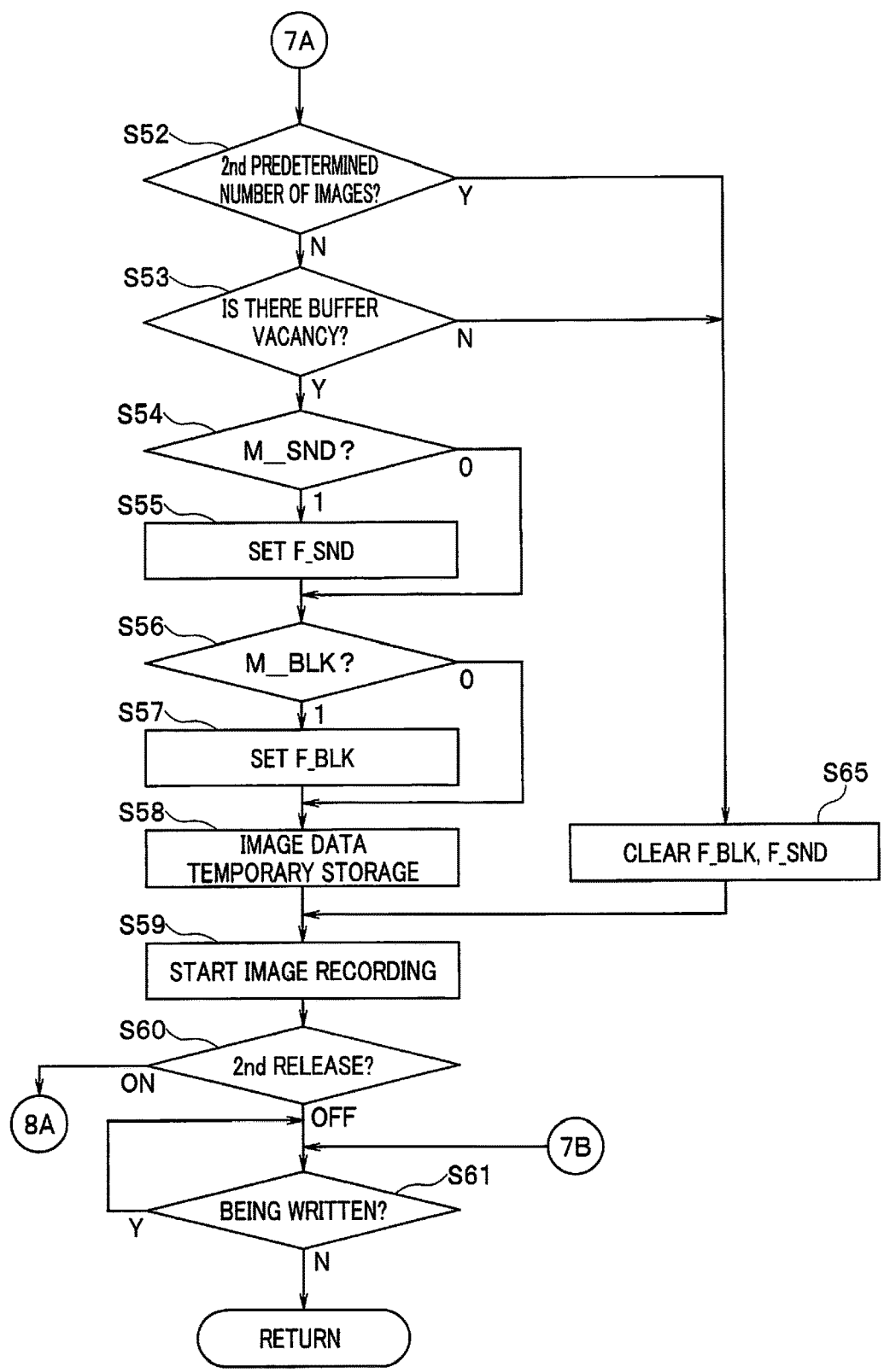
FIG. 8 is the flowchart (a latter half) showing the subsequence during the continuous image pickup operation mode (the continuous photographing mode) in the image pickup processing (the image pickup processing in step S9 in FIG. 3) of the image pickup apparatus shown in FIG. 1.

FIGS. 7 and 8 are a flowchart showing a subsequence during a continuous image pickup operation mode (so-called continuous photographing mode) in the image pickup processing (the image pickup processing in step S9 in FIG. 3) of the image pickup apparatus according to the present embodiment. Note that FIG. 7 shows a former half of the flowchart and FIG. 8 shows a latter half of the flowchart.

First, in the image pickup operation mode of the image pickup apparatus 1, if the image pickup apparatus 1 is set in the single photographing mode, the subroutine shown in FIGS. 4 and 5 is executed.

That is, when execution of the image pickup processing (during the single photographing mode) in step S9 in FIG. 3 is started, first, in step S21 in FIG. 4, the control section 20 executes initialization processing (buffer clear processing) for the buffer memory 13.

Subsequently, in step S22 in FIG. 4, the control section 20 executes the image data reading processing.

Subsequently, in step S23, control section 20 executes the live view image processing.

In the next step S24, the control section 20 executes the live view image display processing.

As the processing in steps S22, S23, and S24, the processing in steps S2, S3, and S4 in FIG. 3 is continuously performed.

Subsequently, in step S25 in FIG. 4, the control section 20 monitors the operation input section 21 and confirms whether there is an output (an ON signal) of the 1st release SW 34. If the control section 20 confirms the ON signal of the 1st release SW 34, the control section 20 determines that the 1st release pressing operation is continuously performed and proceeds to processing in the next step S26. On the other hand, if the control section 20 does not confirm the ON signal of the 1st release SW 34, that is, if the control section 20 confirms that the 1st release SW 34 is turned off (the ON signal is interrupted), the control section 20 proceeds to processing in step S35 in FIG. 5 (see reference sign 4B in FIGS. 4 and 5).

Subsequently, in step S26 in FIG. 4, the control section 20 monitors the operation input section 21 and confirms whether there is an output (an ON signal) of the 2nd release SW 35. If the control section 20 confirms the ON signal of the 2nd release SW 35, the control section 20 proceeds to the next step S27. On the other hand, if the control section 20 does not confirm the ON signal of the 2nd release SW 35, that is, if the control section 20 confirms that the 2nd release SW 35 is OFF (the ON signal is interrupted), the control section 20 proceeds to processing in step S36.

In step S36 in FIG. 4, the control section 20 confirms whether there is a vacancy of the first buffer region of the buffer memory 13.

In the first buffer region of the buffer memory 13, image data acquired by the first image pickup means while, after the 1st release signal is brought into the ON state, the ON state is maintained is temporarily recorded. However, the recording region is not limitlessly present and is secured only for a predetermined number of images set in advance. In this case, the predetermined number of images is a specified number determined in advance for each of apparatuses or a number set in advance by the user.

Therefore, in the processing in step S36, the control section 20 confirms a vacancy state of the first buffer region of the buffer memory 13 to determine whether temporary saving (temporary recording) in the later step S38 is possible. Concerning the processing in step S36, in a first loop, that is, immediately after the initialization in the buffer clear processing in step S21, the first buffer region is in a fully vacant state.

If the control section 20 confirms in the processing in step S36 that there is a vacancy in the first buffer region, the control section 20 proceeds to processing in step S38. On the other hand, if the control section 20 confirms that there is no vacancy in the first buffer region, the control section 20 proceeds to processing in step S37.

In step S37 in FIG. 4, the control section 20 executes processing for deleting oldest image data (referred to as buffer first image data) among the image data recorded in the first buffer region of the buffer memory 13 and image data corresponding to the buffer first image data among the image data in the third buffer region. Thereafter, the control section 20 proceeds to the processing in step S38.

In step S38 in FIG. 4, the control section 20 temporarily saves image data for new one image in the first buffer region of the buffer memory 13. Thereafter, returning to the processing in step S22, the control section 20 repeats the series of processing after step S22 (i.e., the series of processing in steps S22 to S26 and steps S36 to S38 in FIG. 4). This repetition processing is performed until the ON signal of the 2nd release SW 35 is confirmed in the processing in step S26.

In this way, the series of processing (the series of processing in steps S22 to S26 and steps S36 to S38 in FIG. 4) is continued while the ON state of the 1st release signal is continued. In parallel to the processing, in the third buffer region of the buffer memory 13, the control section 20 temporarily saves image data for recording respectively corresponding to the image data stored in the first buffer region.

Note that, if the first buffer region of the buffer memory 13 is filled and falls into a state without any fee space (this state is referred to as buffer full state) in the processing in step S36, as explained above, the control section 20 performs the deletion of the old image data to secure a free space of the first buffer region in the processing in step S37 and then performs temporary storage processing for the next image data.

On the other hand, if the control section 20 confirms the ON signal of the 2nd release SW 35 in the processing in step S26 and proceeds to the processing in step S27 in FIG. 4, in step S27, the control section 20 performs image data temporary storage processing in the second buffer region of the buffer memory 13. The image data temporary storage processing performed here is processing executed by receiving the generation of the ON signal of the 2nd release SW 35 in the processing in step S26.

For example, in the example shown in FIG. 2, the 2nd release signal is generated at timing of "2nd ON" shown in the field of the "release signal". An image (a frame number "7" in FIG. 2) displayed as live view at a point in time of the generation of the 2nd release ON signal or an image (a frame number "8" in FIG. 2) immediately after the point in time of the generation of the 2nd release ON signal and a predetermined number of images before the image are temporarily saved. In FIG. 2, images after the point in time of the generation of the 2nd release ON signal are temporarily saved. However, this is a form during the continuous photographing mode explained below. Thereafter, the control section 20 proceeds to the processing in step S28 in FIG. 5.

The image pickup apparatus 1 according to the present embodiment includes a plurality of notifying means for notifying an operation status to the user during the execution of the image pickup operation. The notifying means are, for example, constituent units that appeal to visual and auditory senses of the user using the display sections (18, 31, and 32) and the sound emitting means (19 and 33).

More specifically, as a form of notification performed using the display sections, in the continuous photographing mode explained below, image display is continuously performed. In the single photographing mode, there is a notification form for providing a black image display mode (in FIGS. 5 and 6, described as "M_BLK") for inserting and displaying a black image (for displaying a display image entirely occupied by only black; blacking out) prepared in advance at predetermined timing (e.g., in every recording operation of an image) during display of a live view image of a single image picked up when the 2nd release SW is ON. Note that, in the black image display mode, the image inserted and displayed during the live view display may be an image other than the black image. For example, as an example of the inserted and displayed image, a semitransparent gray image may be displayed or a predetermined icon may be displayed. Other various display forms are conceivable.

As a notification form performed using the sound emitting means, similarly, in the continuous photographing mode explained below, image display is continuously performed. In the single photographing mode, a sound emission mode (in FIGS. 5 and 6, described as "M_SND") is provided in which pseudo shutter sound or the like prepared in advance is emitted at predetermined timing (e.g., in every recording operation of an image) during display of a live view image of a single image photographed when the 2nd release SW is ON. In the image pickup apparatus 1, the two operation modes can be set in combination. An example of the combination is shown in FIG. 6.

The black image display mode and the sound emission mode can be set by the user at any time by starting the image pickup apparatus 1 and performing menu screen operation. Processing for setting the black image display mode and the sound emission mode is included in, for example, the processing in step S10 of the main sequence shown in FIG. 3.

As a specific application example of a setting example, for example, during image pickup of a stage or the like, there is a demand for prioritizing silencing. Therefore, in this case, the "sound emission mode (M_SND)" is not set (flag=0; no sound setting) and only the "black image display mode (MBLK)" is set (flag=1; there is blackout setting) or does not have to be set (flag=0; no blackout setting).

For example, during image pickup of dynamic motions of sports, birds, and the like, there is a demand for prioritizing visibility of live view display. Therefore, in this case, the "sound emission mode (M_SND)" is set (flag=1; there is sound setting) and the "black image display mode (M_BLK)" is not set (flag=0; no blackout setting).

Further, for example, when it is desired to perform image pickup with a sense equivalent to a general single-lens reflex camera or the like in the past, both of the "sound emission mode (M_SND)" and the "black image display mode (MBLK)" are set (flag=1; there is sound setting+there is blackout setting).

Referring back to FIG. 5, in step S28, the control section 20 confirms current setting of the sound emission mode "M_SND" in the image pickup apparatus 1. The sound emission mode "M_SND" is an operation mode for emitting, for example, pseudo shutter sound at acquisition timing of image data acquired after the generation of the 2nd release ON signal or at every acquisition timing of image data acquired after the generation of the 2nd release ON signal in the continuous photographing mode.

If the sound emission mode "M_SND" is set (flag=1; there is sound setting), the control section 20 proceeds to processing in S29. On the other hand, if the sound emission mode "M_SND" is not set (flag=0; no sound setting), the control section 20 proceeds to processing in step S30.

In step S29 in FIG. 5, the control section 20 controls to drive the speaker 33 via the sound-emission driving section 19 and executes sound emission operation processing. Thereafter, the control section 20 proceeds to the processing in step S30.

Subsequently, in step S30 in FIG. 5, the control section 20 confirms current setting of the black image display mode "M_BLK" in the image pickup apparatus 1. The black image display mode "M_BLK" is an operation mode for, at acquisition timing of image data acquired at a point in time of or immediately after the generation of the 2nd release ON signal, for example, displaying the black image only once immediately before displaying an image of the image data. By adopting such a display form, there is an effect that it is possible to visually notify the user that a recording operation of the image data is performed at the point in time of the generation of the 2nd release ON signal.

If the black image display mode "M_BLK" is set (flag=1; there is blackout setting), the control section 20 proceeds to processing in step S31. On the other hand, if the black image display mode "M_BLK" is not set (flag=0; no blackout setting), the control section 20 proceeds to processing in step S32.

In step S31 in FIG. 5, the control section 20 controls to drive the display apparatus (the EVF 31 or the back monitor 32) via the display driving section 18 and execute black image display operation processing. Thereafter, the control section 20 proceeds to processing in step S32.

In the field of the "image display (LV)" shown in FIG. 2, "an index (a hatching section) indicated by hatching" before display of the image with the frame number "8", which is an image that should be displayed immediately after generation timing of the "2nd release ON", represents black image display. In the example shown in FIG. 2, the black image is displayed for each of images displayed after the frame number "8". However, this display form is a display form during the "continuous photographing mode" explained below. During the "single photographing mode" explained here, as explained above, the black image is displayed only once immediately before the image with the frame number "8" is displayed.

In step S32 in FIG. 5, the control section 20 controls the external memory IF section 22 and starts processing for recording image data in the memory card 36. The image data recording processing performed here is, for example, processing for recording only predetermined one image retroactive by the number of images set in advance by the user taking into account a release time lag (in the case of the single photographing mode).

Note that the image data recording processing during the single photographing mode is not limited to the form explained above, that is, the recording of only the predetermined one image. For example, a form for recording three image data in total including the predetermined one image retroactive by the number of images set in advance by the user taking into account the release time lag and images of one frame before and one frame after the predetermined one image may be adopted. A form for collectively recording a plurality of image data up to a predetermined point in time (e.g., the point in time of the 2nd release signal generation) after the predetermined one image may be adopted.

In step S33 in FIG. 5, the control section 20 displays an image corresponding to the image data recorded in the processing in step S32. When the form for recording the plurality of images is adopted, for example, after displaying a latest image, by displaying notification to that effect (there are the plurality of recorded images) to be superimposed on the displayed image and performing predetermined operation, the control section 20 may be able to retroactively display one image at a time from the latest image being displayed.

Subsequently, in step S34 in FIG. 5, the control section 20 monitors the operation input section 21 and confirms an output signal of the 1st release SW 34 until the 1st release SW 34 is turned off (the ON signal is interrupted). If the control section 20 confirms that the 1st release SW 34 is turned off, the control section 20 proceeds to processing in the next step S35.

Subsequently, in step S35 in FIG. 5, the control section 20 monitors the external memory IF section 22 and confirms whether an image data writing operation (i.e., processing for recording the image data in the memory card 36) is being executed. The control section 20 performs this confirmation processing until the image data writing operation ends. If the control section 20 confirms the end of the writing processing, the control section 20 returns to the original main sequence. If the power-on is kept in step S8, the control section 20 returns to step S2.

In the image pickup processing during the single photographing mode, it is possible to eliminate unnecessary image pickup, acquire an image by desired timing, and automatically save the image in the memory card.

Subsequently, in the image pickup operation mode of the image pickup apparatus 1, when the image pickup apparatus 1 is set in the continuous photographing mode, a subroutine shown in FIGS. 7 and 8 is executed.

That is, when the execution of the image pickup processing (during the continuous photographing mode) in step S9 in FIG. 3 is started, first, in step S41 in FIG. 7, the control section 20 executes initialization processing (buffer clear processing) for the buffer memory 13.

Subsequently, in step S42 in FIG. 7, the control section 20 initializes (clears) respective settings of a black image display mode flag F_BLK and a sound emission mode flag F_SND.

Subsequently, in step S43 in FIG. 7, the control section 20 executes image data reading processing. The processing in step S43 is processing same as the processing in step S2 in FIG. 3 explained above. In step S43, the processing is continuously performed.

Subsequently, in step S44 in FIG. 7, the control section 20 confirms a setting state of the sound emission mode flag F_SND. If the control section 20 confirms that the sound emission mode flag F_SND is 1 (set), the control section 20 proceeds to processing in step S45. If the control section 20 confirms that the sound emission mode flag F_SND is 0 (not set), the control section 20 proceeds to processing in step S46.

In step S45 in FIG. 7, the control section 20 controls to drive the speaker 33 via the sound-emission driving section 19 and executes predetermined sound emission processing.

Subsequently, in step S46 in FIG. 7, the control section 20 confirms a setting state of the black image display mode flag F_BLK. If the control section 20 confirms that the black image display mode flag F_BLK is 1 (set), the control section 20 proceeds to processing in step S47. If the control section 20 confirms that the black image display mode flag F_BLK is 0 (not set), the control section 20 proceeds to processing in step S48.

In step S47 in FIG. 7, the control section 20 controls to drive the display apparatus (selected one of the EVF 31 or the back monitor 32) via the display driving section 18 and executes predetermined black image display processing.

As explained below, F_SND and F_BLK are set according to setting state of M_SND and M_BLK when images are recorded after the 2nd release signal generation, in a live view display image, the black image (the sound emission) is inserted and displayed in intervals of respective image data of the live view image display at every acquisition timing of image data acquired after the generation of the 2nd release ON signal. By adopting such a display form, the black image (the sound emission) is displayed in every recording operation of image data continuously acquired after the point in time of the generation of the 2nd release ON signal. Therefore, there is an effect that the user can visually identify that recording by the continuous photographing mode is performed.

Subsequently, in step S48 in FIG. 7, the control section 20 executes the live view image processing.

Subsequently, in step S49, the control section 20 executes the live view image display processing.

In step S50 in FIG. 7, the control section 20 monitors the operation input section 21 and confirms whether there is an output (an ON signal) of the 1st release SW 34. If the control section 20 confirms the ON signal of the 1st release SW 34, the control section 20 determines that the 1st release pressing operation is continuously performed and proceeds to processing in the next step S51. On the other hand, if the control section 20 does not confirm the ON signal of the 1 st release SW 34, that is, if the control section 20 confirms that the 1st release SW 34 is turned off (the ON signal is interrupted), the control section 20 proceeds to processing in step S61 in FIG. 8 (see reference sign 7B in FIGS. 7 and 8).

Subsequently, in step S51 in FIG. 7, the control section 20 monitors the operation input section 21 and confirms whether there is an output (an ON signal) of the 2nd release SW 35. If the control section 20 confirms the ON signal of the 2nd release SW 35, the control section 20 proceeds to processing in step S52 in FIG. 8 (see reference sign 7A in FIGS. 7 and 8). At this point, for example, in the example shown in FIG. 2, a 2nd release signal is generated at timing of "2nd ON" shown in the field of the "release signal". A predetermined number of images after an image (the frame number "7" in FIG. 2) displayed as live view at the point in time of the generation of the 2nd release ON signal are temporarily saved. On the other hand, if the control section 20 does not confirm the ON signal of the 2nd release SW 35, that is, if the control section 20 confirms that the 2nd release SW 35 is OFF (the ON signal is interrupted), the control section 20 proceeds to processing in step S62.

In step S62 in FIG. 7, the control section 20 confirms whether there is a vacancy of the first buffer region of the buffer memory 13. If the control section 20 confirms that there is a vacancy in the first buffer region, the control section 20 proceeds to processing in step S64. On the other hand, if the control section 20 confirms that there is no vacancy in the first buffer region, the control section 20 proceeds to processing in step S63.

In step S63 in FIG. 7, the control section 20 executes processing for deleting oldest image data (referred to as buffer first image data) among the image data recorded in the first buffer region of the buffer memory 13 and image data corresponding to the buffer first image data among the image data in the third buffer region. Thereafter, the control section 20 proceeds to processing in step S64.

In step S64 in FIG. 7, the control section 20 temporarily saves new image data for one image in the first buffer region of the buffer memory 13. In parallel to the temporary saving of the image data, in the third buffer region of the buffer memory 13, the control section 20 temporarily saves image data for recording respectively corresponding to the image data stored in the buffer region. Thereafter, the control section 20 returns to the processing in step S42.

On the other hand, if the control section 20 confirms the ON signal of the 2nd release SW 35 in the processing in step S51 and proceeds to the processing in step S52 in FIG. 8, in step S52, the control section 20 confirms whether the number of images acquired after the generation of the ON signal of the 2nd release SW 35 in step S51 in FIG. 7 has reached a predetermined number of images set by the user in advance. If the control section 20 confirms that the number of images acquired after the generation of the ON signal of the 2nd release SW 35 has reached the predetermined number of images set in advance, the control section 20 proceeds to processing in step S65. Note that processing for setting the predetermined number is included in, for example, the processing in step S10 of the main sequence shown in FIG. 3.

If the control section 20 confirms in processing in step S52 that the number of images acquired after the generation of the ON signal of the 2nd release SW 35 has not reached the predetermined number of images set in advance, the control section 20 proceeds to processing in step S53. (The predetermined number of images is set when the user sets a limit of the number of photographed frames after the 2nd release. When the limit of the number of photographed frames is not set, that is, when continuous photographing is continued while the 2nd release SW 35 is pressed, step S53 is unnecessary).

Subsequently, in step S53 in FIG. 8, the control section 20 confirms whether there is a vacancy in the second buffer region and the third buffer region of the buffer memory 13. If the control section 20 confirms that there is a vacancy in the second buffer region and the third buffer region, the control section 20 proceeds to processing in step S54. On the other hand, if the control section 20 confirms that there is no vacancy in the second buffer region and the third buffer region, the control section 20 proceeds to processing in step S65.

Subsequently, in step S54 in FIG. 8, the control section 20 confirms current setting of the sound emission mode "M_SND". The sound emission mode "M_SND" is an operation mode for sounding, for example, pseudo shutter sound at every acquisition timing of image data acquired after the generation of the 2nd release ON signal. If the sound emission mode "M_SND" is set (flag=1; there is sound setting), the control section 20 proceeds to processing in step S55. If the sound emission mode "M_SND" is not set (flag=0; no sound setting), the control section 20 proceeds to processing in step S56.

Subsequently, in step S55 in FIG. 8, the control section 20 sets the sound emission mode flag F_SND.

Subsequently, in step S56 in FIG. 8, the control section 20 confirms current setting of the black image display mode "M_BLK". The black image display mode "M_BLK" is an operation mode for, at every acquisition timing of image data acquired after the generation of the 2nd release ON signal, displaying, for example, the black image in intervals of respective image data of normal live view image display (see the black image display of "the index (the hatching section) indicated by hatching" in the "image display (LV)" field in FIG. 2). If the black image display mode "M_BLK" is set (flag=1; there is blackout setting), the control section 20 proceeds to processing in step S57. If the black image display mode "M_BLK" is not set (flag=0; no blackout setting), the control section 20 proceeds to processing in step S58.

Subsequently, in step S57 in FIG. 8, the control section 20 sets the black image display mode flag F_BLK.

Subsequently, in step S58 in FIG. 8, the control section 20 temporarily saves image data for new one image in the second buffer region of the buffer memory 13. In parallel to the temporary saving of the image data, after applying predetermined image processing to the temporarily saved image data, the control section 20 executes processing for temporarily saving the image data after the processing in the third buffer region.

Subsequently, in step S59 in FIG. 8, the control section 20 controls the external memory IF section 22 and starts processing for sequentially recording, in the memory card 36, the image data in the third buffer region. When the "time lag setting" is set, the control section 20 records image data after image data retroactive by the number of images corresponding to a set number of images from the point in time when the 2nd release signal is generated (i.e., image data temporarily saved while the 1st release signal is ON).

Subsequently, in step S60 in FIG. 8, the control section 20 monitors the operation input section 21 and confirms whether there is an output (an ON signal) of the 2nd release SW 35. If the control section 20 confirms the ON signal of the 2nd release SW 35, the control section 20 returns to the processing in step S43 in FIG. 7 (see reference sign 8A in FIGS. 7 and 8). On the other hand, if the control section 20 does not confirm the ON signal of the 2nd release SW 35, that is, if the control section 20 confirms that the 2nd release SW 35 is OFF (the ON signal is interrupted), the control section 20 proceeds to processing in step S61.

Subsequently, in step S61 in FIG. 8, the control section 20 monitors the external memory IF section 22 and confirms whether an image data writing operation (i.e., processing for recording image data in the memory card 36) is being executed. The control section 20 performs this confirmation processing until the image data writing operation (i.e., the recording in the memory card) ends. If the control section 20 confirms the end of the writing processing, the control section 20 returns to the original main sequence.

If the processing branches from steps S52 and S53 to step S65, that is, if the number of frames after the 2nd release signal generation set in advance is finished to be photographed or if there is no vacancy in the second buffer region and the third buffer region, although the photographing is continued, the control section 20 clears F_SND and F_BLK in step S65. According to this processing, when the control section 20 returns to sign 8A in FIG. 7 and continuing the processing, the control section 20 does not execute the sound emission processing in step S45 and the black image display processing in step S47. That is, when an image is not recorded, neither the sound emission nor the black image display is performed.

Frame numbers "15" and "16" in FIG. 2 is equivalent to the case explained above in that the black image display is not performed because there is no vacancy in the buffer and an image cannot be recorded. Note that, every time recording of an image in the card ends, a vacant region is formed in the buffer. Therefore, at that point in time, the black image display and the recording of a captured image are resumed (see a frame number "17").

Details of a "number-of-frames setting" processing sequence in the various processing sequences included in the setting change processing in step S6 in FIG. 3 are explained below.

Figure 9:
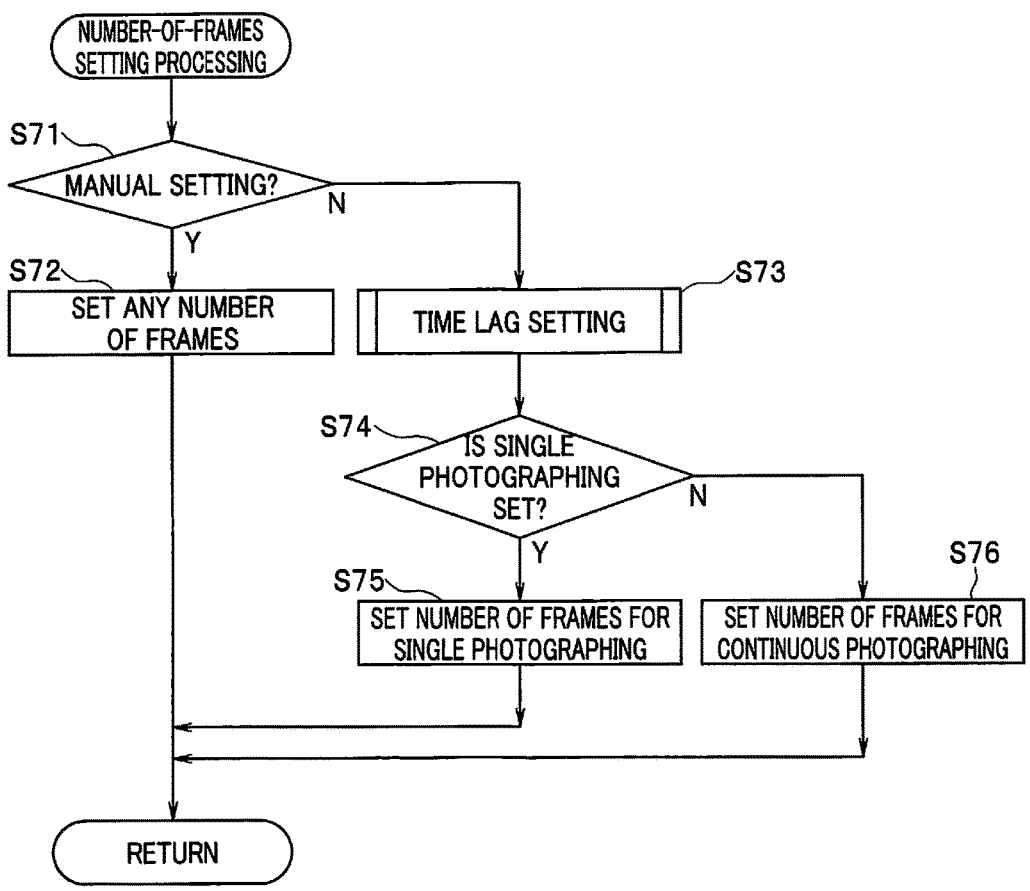
FIG. 9 is a flowchart showing a "number-of-frames setting" processing sequence of setting change processing (processing in step S10 in FIG. 3) in the main sequence of the image pickup apparatus shown in FIG. 1.
Figure 10:
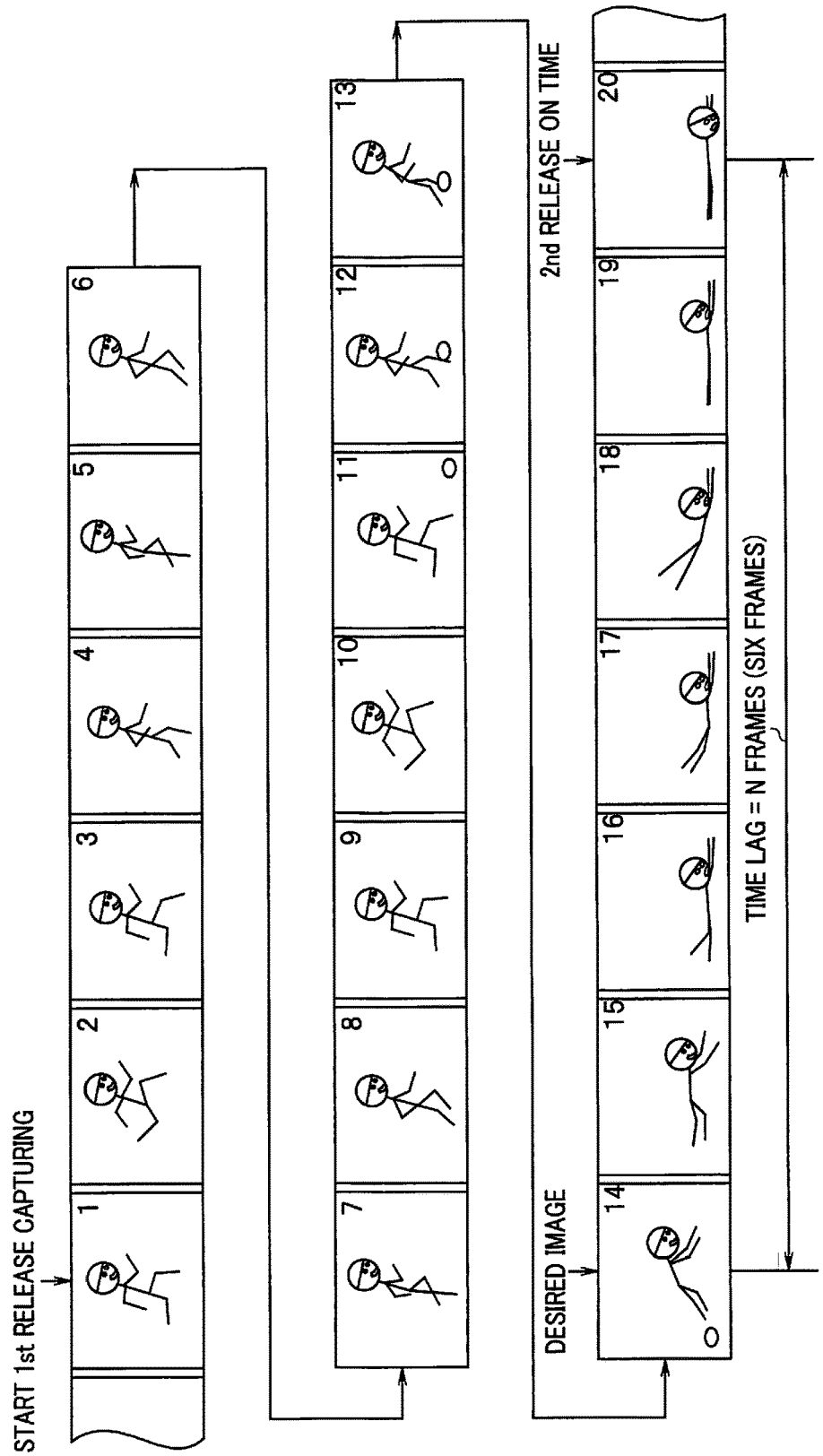
FIG. 10 is an explanatory diagram for explaining a concept of the number of frames set in the "number-of-frames setting" processing shown in FIG. 9.
Figure 11:
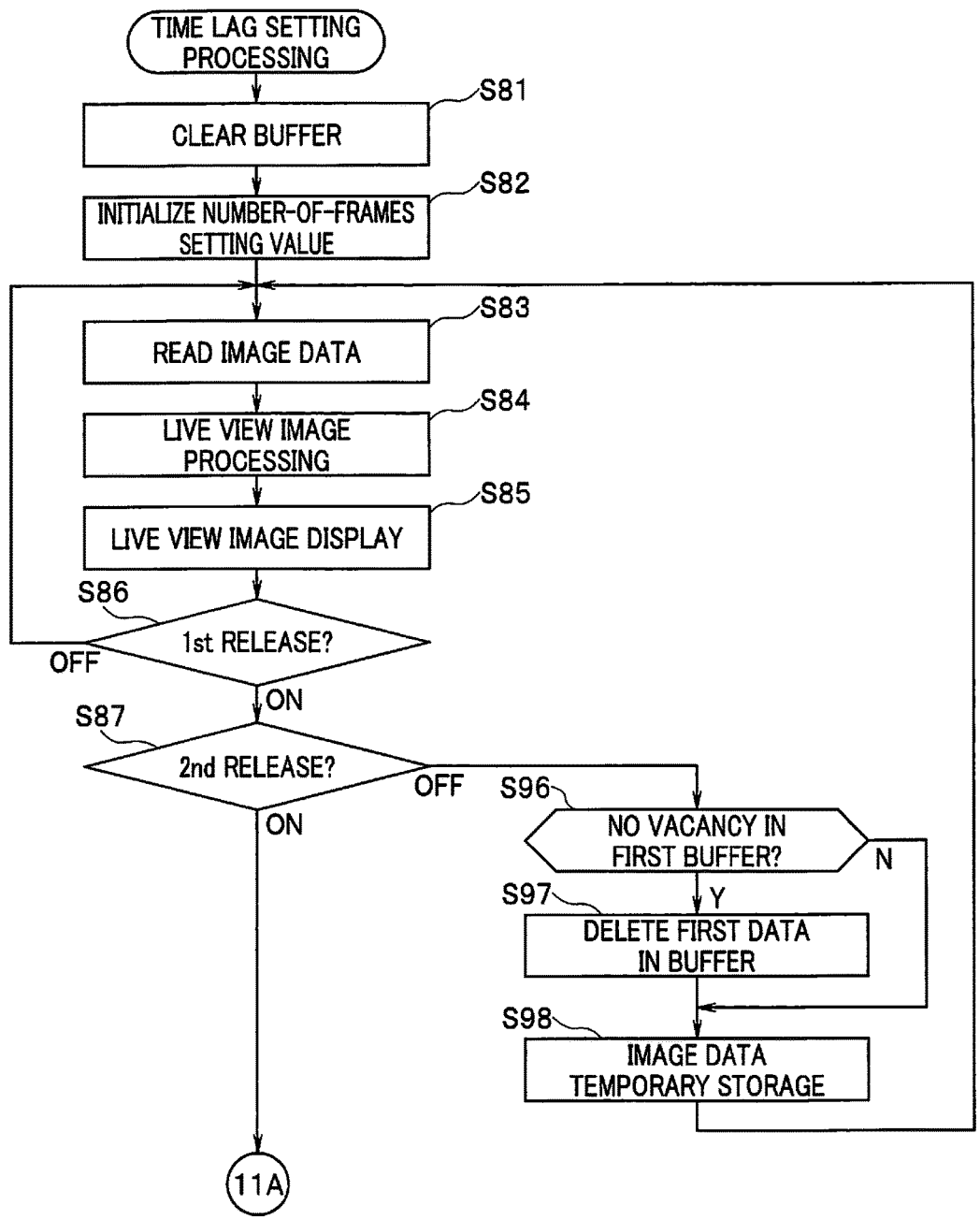
FIG. 11 is a flowchart (a former half) showing a "time lag setting" processing sequence (processing in step S73 in FIG. 9) in the "number-of-frames setting" processing shown in FIG. 9.
Figure 12:
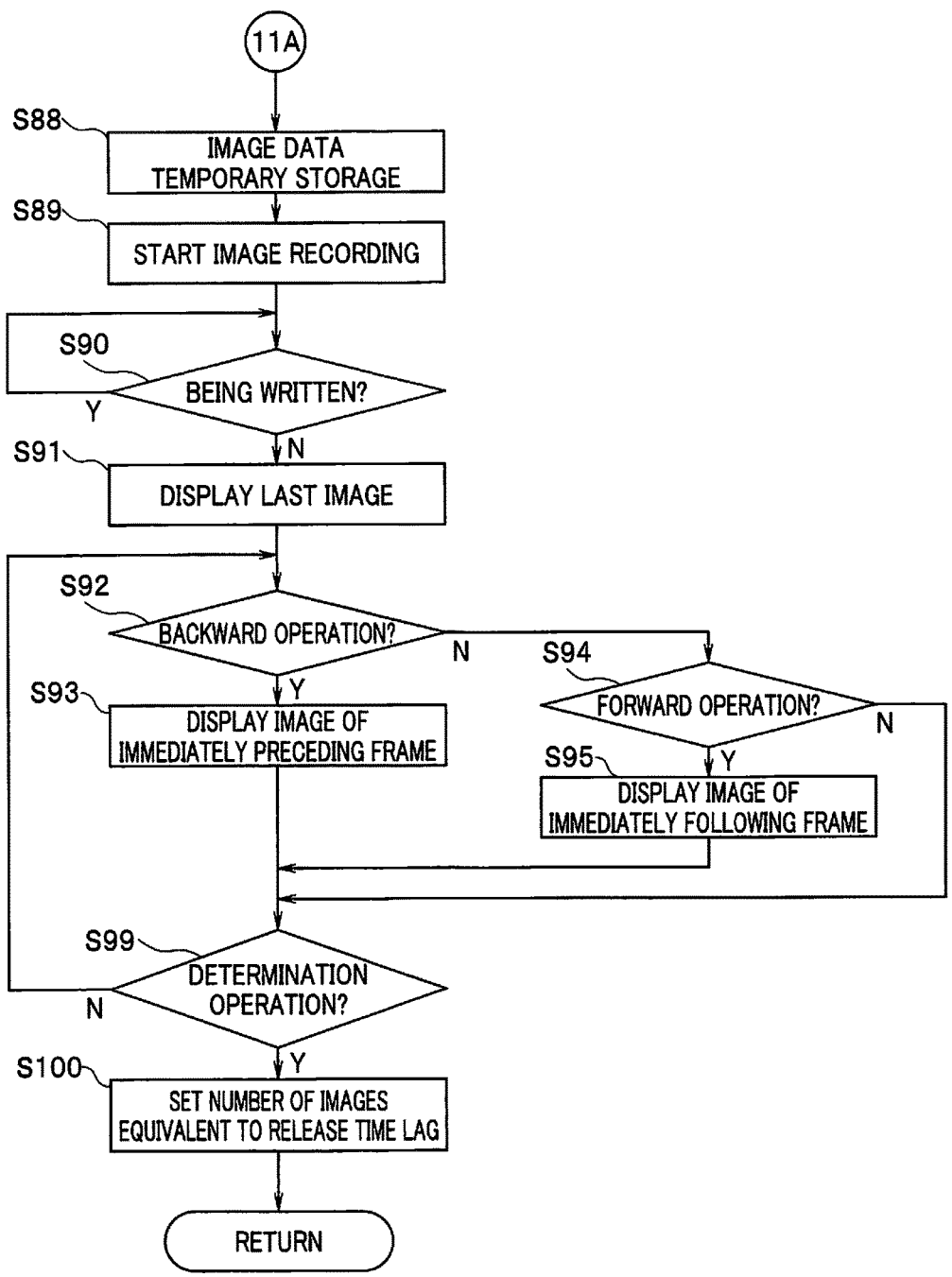
FIG. 12 is the flowchart (a latter half) showing the "time lag setting" processing sequence (the processing in step S73 in FIG. 9) in the "number-of-frames setting" processing sequence shown in FIG. 9.

FIG. 9 is a flowchart showing the "number-of-frames setting" processing sequence of the setting change processing (the processing in step S10 in FIG. 3) in the main sequence of the image pickup apparatus according to the present embodiment. FIG. 10 is an explanatory diagram for explaining a concept of the number of frames set in the "number-of-frames setting" processing shown in FIG. 9. FIGS. 11 and 12 are a flowchart showing the "time lag setting" processing sequence (the processing in step S73 in FIG. 9) in the "number-of-frames setting" processing sequence shown in FIG. 9. Note that FIG. 11 shows a former half of the flowchart and FIG. 12 shows a latter half of the flowchart.

First, the "number-of-frames setting" processing is explained below. FIG. 10 conceptually shows a live view display image displayed using the display apparatus (the EVF 31 or the back monitor 32) when the image pickup operation is performed by the image pickup apparatus 1 according to the present embodiment.

In FIG. 10, a time-series change of an object set as an image pickup target by the user is shown in respective image frames. Numbers shown at upper right corners in the respective image frames indicate frame numbers. It is assumed that the frame numbers indicate that images are acquired in order of the numbers in a display example shown in FIG. 10.

In FIG. 10, it is assumed that 1st release operation is performed and a 1st release signal is generated at timing when an image with a frame number "1" is acquired, processing for capturing (temporarily saving) image data in the first buffer region is started, and thereafter the 1st release signal is continuously generated.

In this case, the user performs 2nd release operation at desired timing while viewing the live view display image and tracking the image pickup target object.

In FIG. 10, it is assumed that an image that the user desires to pick up is an image with a frame number "14". Therefore, the user performs the 2nd release operation at predetermined timing in order to acquire the image with the frame number "14". However, since a release time lag is present, an actual 2nd release signal is generated at timing when an image with a frame number "20" is acquired.

In this case, when the release time lag is taken into account, the image desired by the user (the frame number "14") is equivalent to a predetermined image retroactive by N frames=six frames from a point in time (the frame number "20") when the actual 2nd release signal is generated.

Therefore, in the case of this example, a value N of the number-of-frames setting is set as N=6 taking into account the release time lag. Image data actually recorded in the memory card 36 is determined on the basis of the setting value.

That is, image data after a point in time of the generation of the 1st release signal continues to be sequentially temporarily recorded in the first buffer region. When the 2nd release signal is generated, image data of a predetermined image retroactive by the number-of-frames setting value N=6 from a point in time of the generation of the 2nd release signal is recorded in the memory card 36. At this point, three images in total including the image data equivalent to N=6 and images of one frame before and one frame after the image data may be recorded. A form for recording all of the predetermined image retroactive by the six frames and a continuous plurality of images following the predetermined image until a predetermined point in time (e.g., the point in time of the generation of the 2nd release signal) may be adopted.

As explained above, in the example shown in FIG. 10, a difference (a delay; a time lag) of six frames is present between image data captured at timing when the user thinks that the user performed the 2nd release operation and image data captured at timing when the 2nd release signal is actually generated. The delay (the time lag) is a release time lag acquired by combining a response delay of the user and a response delay of the apparatus itself.

Details of the "number-of-frames setting" processing sequence among the various processing sequences included in the setting change processing in step S6 in FIG. 3 are explained below with reference to FIG. 9. The "number-of-frames setting" processing is processing for setting a setting value in advance in order to set, as image data to be actually recorded, image data captured at a point in time different from (a point in time retroactive by a plurality of frames from) the point in time of the generation of the 2nd release signal taking into account time lags peculiar to the user and each of image pickup apparatuses that occur during the image pickup operation. More specifically, the "number-of-frames setting" processing is setting of the number of frames retroactive from the point in time of the generation of the 2nd release signal.

That is, the "number-of-frames setting" processing is setting for acquiring a desired image in advance and is processing for setting the number of frames retroactive from the point in time of the generation of the 2nd release signal.

Note that the "number-of-frames setting" processing may have two setting values, that is, a number-of-frames setting value during the single photographing mode and a numberof-frames setting value during the continuous photographing mode. In this case, the setting value corresponding to the single photographing mode is a number-of-retroactive-frames setting value itself and the setting value corresponding to the continuous photographing mode is the number-of-retroactive-frames setting value and a number-of-frames value that should be recorded after the number-of-retroactive-frames setting value.

When the "number-of-frames setting" processing sequence shown in FIG. 9 is executed, first, in step S71 in FIG. 9, the control section 20 monitors the operation input section 21 and confirms whether predetermined number-of-frames setting operation (manual setting operation) by manual operation is performed. If the control section 20 confirms the manual setting operation, the control section 20 proceeds to processing in step S72. If the manual setting operation is not confirmed, the control section 20 proceeds to processing in step S73.

In step S72 in FIG. 9, the control section 20 receives an operation input of the operation input section 21 by the user and sets any number-of-frames value desired by the user, that is, a number-of-retroactive-frames value of image data actually recorded during the image pickup operation involved in the 2nd release operation. Thereafter, the control section 20 returns to the main sequence.

On the other hand, in step S73 in FIG. 9, the control section 20 executes a predetermined "time lag setting" processing sequence (subroutine). Details of the "time lag setting" processing sequence (subroutine) are explained below with reference to FIGS. 11 and 12. When the control section 20 finishes "time lag setting" processing in step S73, the control section 20 proceeds to processing in the next step S74.

Subsequently, in step S74 in FIG. 9, the control section 20 confirms current setting and confirms whether the single photographing mode is set. If the single photographing mode is set, the control section 20 proceeds to processing in step S75. If the single photographing mode is not set (if the continuous photographing mode is set), the control section 20 proceeds to processing in step S76.

In step S75 in FIG. 9, the control section 20 sets a number-of-frames setting value according to the single photographing mode. Thereafter, the control section 20 ends the series of processing (returns).

In step S76 in FIG. 9, the control section 20 sets a number-of-frames setting value according to the continuous photographing mode. Thereafter, the control section 20 ends the series of processing (returns).

Details of the "time lag setting" processing sequence in step S73 in FIG. 9 are explained below with reference to FIGS. 11 and 12. "Time lag setting" processing illustrated in FIGS. 11 and 12 is processing for the user to perform setting of release timing taking into account a release time lag by designating any number-of-retroactive-frames value with manual operation.

In step S81 in FIG. 11, the control section 20 executes initialization processing (buffer clear processing) for the buffer memory 13.

Subsequently, in step S82 in FIG. 11, the control section 20 performs processing for initializing a number-of-frames setting value. The processing for initializing the number-of-frames setting value is processing for setting a maximum number of images by which image data captured in a period in which the 1st release signal is generated can be recorded in the first buffer region of the buffer memory 13.

Subsequently, in step S83 in FIG. 11, the control section 20 executes image data reading processing. The image data reading processing is processing performed by the control section 20 controlling to drive the image pickup device 11 via the image-pickup driving section 16. That is, the image pickup device 11 photoelectrically converts, with the image pickup device 11, an optical image formed on the image pickup surface (not shown in the figure) to generate an analog image signal. The analog image signal is outputted to the AFE circuit section 12. The AFE circuit section 12 performs various kinds of pre-processing including digital conversion processing to generate digital image data. The digital image data is outputted to the image processing section 14. The series of processing is referred to as image data reading processing.

Subsequently, in step S84 in FIG. 11, the control section 20 executes the live view image processing.

In the next step S85 in FIG. 11, the control section 20 executes the live view image display processing.

Subsequently, in step S86 in FIG. 11, the control section 20 monitors the operation input section 21 and confirms whether there is an output (an ON signal) of the 1st release SW 34. If the control section 20 confirms the ON signal of the 1st release SW 34, the control section 20 proceeds to processing in the next step S87. If the control section 20 does not confirm the ON signal of the 1st release SW 34, the control section 20 returns to the processing in step S83.

Subsequently, in step S87 in FIG. 11, the control section 20 monitors the operation input section 21 and confirms whether there is an output (an ON signal) of the 1st release SW 34. If the control section 20 confirms the ON signal of the 1st release SW 34, the control section 20 proceeds to processing in the next step S87. If the control section 20 does not confirm the ON signal of the 1st release SW 34, the control section 20 returns to the processing in step S83.

Subsequently, in step S87 in FIG. 11, the control section 20 monitors the operation input section 21 and confirms whether there is an output (an ON signal) of the 2nd release SW 35. If the control section 20 confirms the ON signal of the 2nd release SW 35, the control section 20 proceeds to processing in step S88 in FIG. 12 (see reference sign 11A in FIGS. 11 and 12). On the other hand, if the control section 20 does not confirm the ON signal of the 2nd release SW 35, that is, if the control section 20 confirms that the 2nd release SW 35 is OFF (the ON signal is interrupted), the control section 20 proceeds to processing in step S96.

In step S96 in FIG. 11, the control section 20 confirms whether there is a vacancy of the first buffer region of the buffer memory 13. If the control section 20 confirms that there is a vacancy in the first buffer region, the control section 20 proceeds to processing in step S98. On the other hand, if the control section 20 confirms that there is no vacancy in the first buffer region, the control section 20 proceeds to processing in step S97.

In step S97 in FIG. 11, the control section 20 executes processing for deleting oldest buffer first image data among the image data recorded in the first buffer region of the buffer memory 13 and image data corresponding to the buffer first image data among the image data in the third buffer region. Thereafter, the control section 20 proceeds to processing in step S98.

In step S98 in FIG. 11, the control section 20 temporarily saves image data for one new image in the first buffer region of the buffer memory 13. In parallel to the temporary saving of the image data, in the third buffer region of the buffer memory 13, the control section 20 temporarily saves image data for recording respectively corresponding to the image data stored in the first buffer region. Thereafter, the control section 20 returns to the processing in step S83.

On the other hand, if the control section 20 confirms the ON signal of the 2nd release SW 35 in the processing in step S87 and proceeds to processing in step S88 in FIG. 12, in step S88, the control section 20 performs image data temporary saving processing in the second buffer region concerning image data at a point in time when the second release operation is performed.

Subsequently, in step S89 in FIG. 12, the control section 20 starts image recording processing. The image recording processing performed in step S89 is processing for recording, in the memory card 36, the image data temporarily saved in the third buffer region.

In step S90 in FIG. 12, the control section 20 monitors the external memory IF section 22 and confirms whether a writing operation (processing for recording) for writing the image data in the memory card 36 is being executed. The control section 20 performs this confirmation processing until the image data writing operation ends. If the control section 20 confirms the end of the writing processing, the control section 20 proceeds to processing in the next step S91.

In step S91 in FIG. 12, the control section 20 controls to drive the display apparatus (the EVF 31 or the back monitor 32) via the display driving section 18 and performs last image display processing. A last image displayed here is an image based on image data corresponding to a point in time when the 2nd release operation is performed in the processing in step S87.

Subsequently, in step S92 in FIG. 12, the control section 20 monitors the operation input section 21 and confirms whether backward operation is performed. The backward operation is, in operation in which the user operates a predetermined operation member to switch an image being displayed on the display apparatus, operation in which the user operates the operation member to display an image acquired temporally before the image currently being displayed. In this case, images that can be displayed are a series of images temporally retroactive from the last image (the image at the point in time of the 2nd release operation) and are images temporarily recorded in the first buffer region among images acquired during the 1st release operation.

If the control section 20 confirms the backward operation in the processing in step S92, the control section 20 proceeds to processing in the next step S93. In step S93, the control section 20 displays, from an image currently being displayed, an image preceding the displayed image by one frame. Thereafter, the control section 20 proceeds to processing in step S99.

On the other hand, if the control section 20 does not confirm the backward operation in the processing in step S92, the control section 20 proceeds to processing in step S94. In step S94, the control section 20 monitors the operation input section 21 and confirms whether forward operation is performed. The forward operation is, in operation in which the user operates the predetermined operation member to switch an image being displayed on the display apparatus, operation in which the user operates the operation member to display an image acquired temporally after the image currently being displayed. If the control section 20 confirms the forward operation, the control section 20 proceeds to processing in the next step S95. In step S95, the control section 20 displays, from an image currently being displayed, an image preceding the displayed image by one frame. If the control section 20 does not confirm the forward operation, the control section 20 proceeds to processing in the next step S99.

In step S99 in FIG. 12, the control section 20 monitors the operation input section 21 and confirms whether determination operation is performed. For example, if the control section 20 confirms the determination operation according to pressing of an operation determination button or the like, which is one of the operation members, the control section 20 proceeds to processing in the next step S100. If the control section 20 does not confirm the determination operation, the control section 20 returns to the processing in step S92.

In this way, the user determines a desired image by selecting and designating an image picked up at desired timing while performing the backward operation and the forward operation concerning a recorded plurality of series image data.

In other words, the user selects, out of the images temporarily saved in the first buffer region (a plurality of images picked up by the first image pickup section), a desired image different from the image acquired at the generation timing of the 2nd release signal (an image immediately after reception of a second signal among images picked up by the second image pickup section). In this case, an image selecting section, which is image selecting means, configured to select a desired image is configured by, for example, an operation member (not shown in the figure) for performing the backward operation, the forward operation, and the determination operation, a switch member (not shown in the figure) for outputting a desired signal according to the operation member, the control section 20 configured to receive the output signal of the switch member and perform predetermined setting such as setting of a number-of-frames setting value.

In step S100 in FIG. 12, the control section 20 performs processing for setting the number of images equivalent to a release time lag. That is, the control section 20 calculates the number of frames equivalent to a difference between an image displayed at a point in time when the determination operation is performed in the processing in step S99 and the last image. The control section 20 registers (saves) a numerical value of the number of frames as a release time lag (a number-of-frames setting value) caused by the user in the image pickup apparatus 1. At this point in time, the selected desired image is displayed on the display screen of the display device (the EVF 31 or the back monitor 32). Thereafter, the control section 20 ends the series of processing and returns to the original sequence.

This time lag measurement processing is action by an image pickup measurement mode section (image pickup means (10, 11, 12, and 13)). That is, in the time lag measurement processing, the image pickup means including the image pickup device 11 (the first image pickup section and the second image pickup section) performs image pickup and the user selects a desired image using the image selecting section and causes a measuring section, which is measuring means, and a measurement-result storing section, which is measurement-result storing means, to act on the basis of the selected desired image.

That is, according to the embodiment, a desired image is selected out of a plurality of images continuously acquired according to the 1st release operation. The number of retroactive images from the image at the point in time of the generation of the 2nd release operation to the desired image is set as a number-of-frames setting value taking into account a release time lag. Timing of image acquisition during the following image pickup operation is set on the basis of the number-of-frames setting value.

In the time lag setting processing, the control section 20, which is control means, performs control for displaying one image (i.e., a desired image and a determined image) out of a plurality of images acquired by the first image pickup section from a first picked-up image by the second image pickup section (the image at the point in time of the generation of the 2nd release signal) retroactively by a measured time period or a set number of images (number of frames).

In this case, in the above illustration, a reference image for the retroacting operation is the first picked-up image by the second image pickup section (the image at the point in time of the generation of the 2nd release signal). However, the reference image for the retroacting operation is not limited to this and may be a last image picked up by the first image pickup section (an image immediately before the generation of the 2nd release signal).

Figure 13:
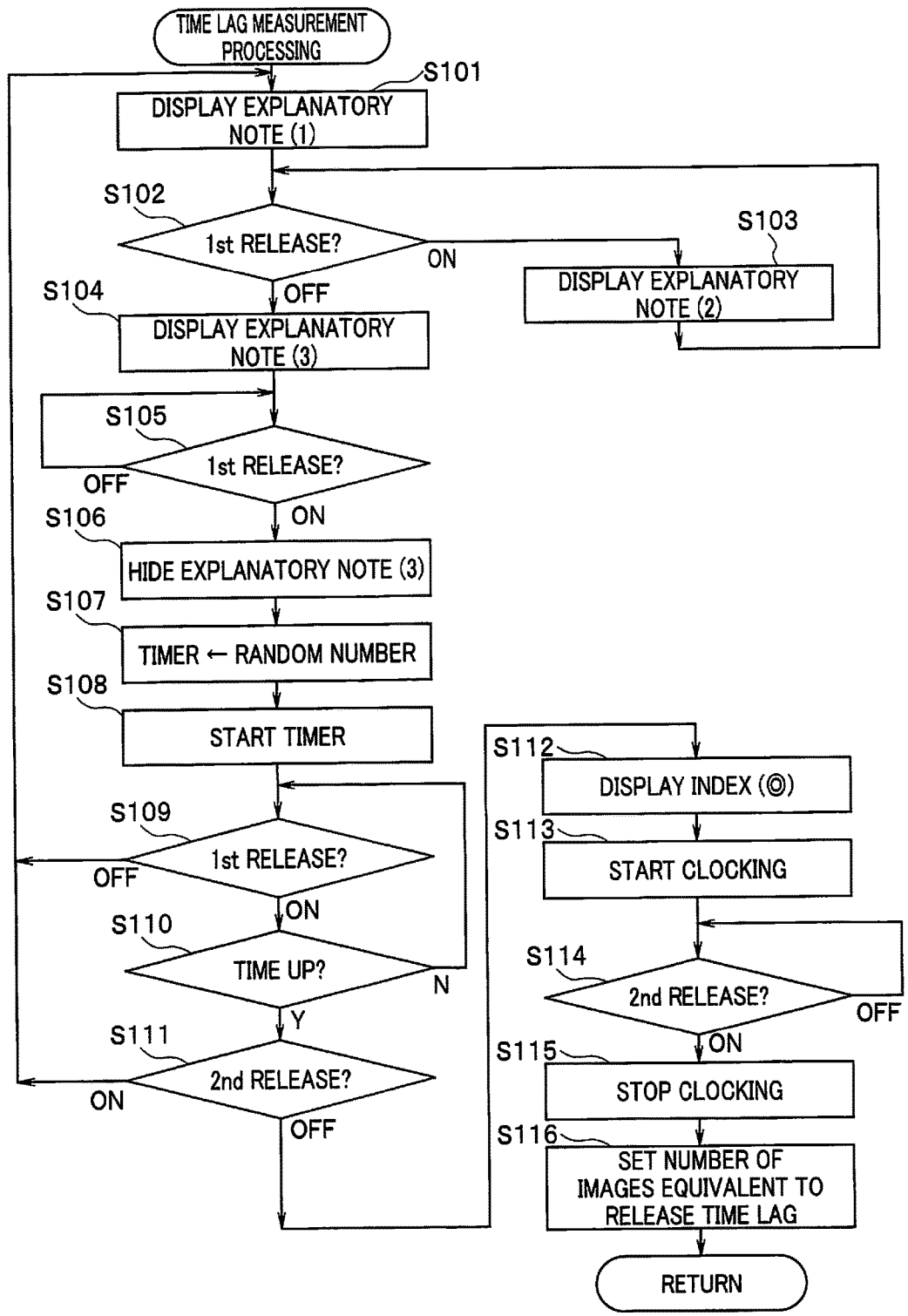
FIG. 13 is a flowchart showing a "time lag measurement" processing sequence equivalent to the "time lag setting" processing sequence (the processing in step S73 in FIG. 9) in the "number-of-frames setting" processing sequence shown in FIG. 9.

A "time lag measurement" processing sequence, which is another illustration concerning the "time lag setting" processing sequence in step S73 in FIG. 9, is explained below with reference to FIG. 13. The "time lag measurement" processing illustrated in FIG. 13 is processing in which the user performs predetermined operation, whereby a number-of-retroactive-frames value is automatically set and a time lag for acquiring a desired image taking into account a release time lag is automatically measured and set. More specifically, the "time lag measurement" processing is processing for automatically measuring, with the measuring section, a time period or the number of images to the desired image acquired by the first image pickup section. This time lag measurement processing is processing for measuring a delay in operation on an operation member with respect to second operation for acquiring a desired image and is processing for performing first display for urging the display section to perform preparation operation on the operation member, performing second display for instructing second operation for not performing image pickup, and, when the second operation is performed, measuring a time period from the second display to the second operation and storing the measured time period. The series of processing is action by an operation-delay measuring section, which is operation-delay measuring means, (the display section, which is the display means, the control section, which is the control means, a clocking section, which is clocking means, etc.). A time lag measurement processing sequence is explained in detail below.

In step S101 in FIG. 13, the control section 20 controls to drive the display apparatus (the EVF 31 or the back monitor 32) via the display driving section 18 and performs processing for continuously displaying a predetermined explanatory note (1) for a predetermined time period (e.g., 3 seconds).

Data of the predetermined explanatory note (1) is written in the internal memory 23 (the flash memory) in advance. The control section 20 reads the data concerning the explanatory note (1) from the internal memory 23 (the flash memory) and displays the data on the display apparatus.

Note that specific words of the explanatory note (1) are, for example, "A release time lag is measured. Please push in the shutter at an instance when "⊙" mark is displayed in the center".

Subsequently, in step S102 in FIG. 13, the control section 20 monitors the operation input section 21 and confirms whether there is an output (an ON signal) of the 1st release SW 34. If the control section 20 confirms the ON signal of the 1st release SW 34, the control section 20 proceeds to processing in the next step S103. If the control section 20 does not confirm the ON signal of the 1st release SW 34, the control section 20 proceeds to processing in step S104.

In step S103 in FIG. 11, the control section 20 controls to drive the display apparatus (the EVF 31 or the back monitor 32) via the display driving section 18 and performs processing for continuously displaying a predetermined explanatory note (2). Thereafter, the control section 20 returns to the processing in step S102. That is, the display of the explanatory note (2) is continued until the 1st release operation by the operation of the shutter button is released.

Data of the predetermined explanatory note (2) is written in the internal memory 23 (the flash memory) in advance. The control section 20 reads the data concerning the explanatory note (2) from the internal memory 23 (the flash memory) and displays the data on the display apparatus.

Note that words of the explanatory note (2) are a message for urging release of operation when the shutter button is pressed from the beginning (in the case of a 1st release ON state). More specifically, the words are, for example, "please detach the finger from the shutter button once".

Subsequently, in step S104 in FIG. 13, the control section 20 controls to drive the display apparatus (the EVF 31 or the back monitor 32) via the display driving section 18 and performs processing for displaying a predetermined explanatory note (3). Thereafter, the control section 20 proceeds to processing in the next step S105.

Data of the predetermined explanatory note (3) is written in the internal memory 23 (the flash memory) in advance. The control section 20 reads the data concerning the explanatory note (3) from the internal memory 23 (the flash memory) and displays the data on the display apparatus.

Note that words of the explanatory note (3) are advice indication concerning the subsequent operation. More specifically, the words are, for example, "When prepared, please half-press the shutter button and hold the shutter button".

Subsequently, in step S105 in FIG. 13, the control section 20 monitors the operation input section 21 and confirms whether there is an output (an ON signal) of the 1st release SW 34. If the control section 20 confirms the ON signal of the 1st release SW 34, the control section 20 proceeds to processing in the next step S106. If the control section 20 does not confirm the ON signal of the 1st release SW 34, the control section 20 repeats the same confirmation processing until confirming the ON signal. In step S106, the control section 20 erases (hides) the display of the explanatory note (3) and proceeds to processing in the next step S107.

In step S107 in FIG. 13, the control section 20 executes processing for setting a random number in a timer. The processing performed here is processing for randomizing timing for displaying a predetermined index "⊙" explained below. More specifically, for example, the control section 20 sets a random number in the timer in a range of approximately 3 to 10 seconds. Although not shown in the figure, the timer is a clocking section, which is clocking means, provided on an inside of the control section 20 and configured to measure a time period.

Subsequently, in step S108 in FIG. 13, the control section 20 starts a clocking operation by the timer (timer start processing).

Subsequently, in step S109 in FIG. 13, the control section 20 monitors the operation input section 21 and confirms whether there is an output (an ON signal) of the 1st release SW 34 again. If the control section 20 confirms the ON signal of the 1st release SW 34, the control section 20 proceeds to processing in the next step S110. If the control section 20 does not confirm the ON signal of the 1st release SW 34, the control section 20 returns to the processing in step S101 and repeats the subsequent processing.

In step S110 in FIG. 13, the control section 20 confirms the clocking of the timer and confirms whether time is up. If the control section 20 confirms the time-up, the control section 20 proceeds to processing in the next step S111. If the control section 20 does not confirm the time-up, the control section 20 returns to step S109.

In step S111 in FIG. 13, the control section 20 monitors the operation input section 21 and confirms whether there is an output (an ON signal) of the 2nd release SW 35. If the control section 20 confirms the ON signal of the 2nd release SW 35, the control section 20 proceeds to the processing in step S101. On the other hand, if the control section 20 does not confirm the ON signal of the 2nd release SW 35, that is, if the control section 20 confirms that the 2nd release SW 35 is OFF (the ON signal is interrupted), the control section 20 proceeds to processing in step S112.

In step S112 in FIG. 13, the control section 20 controls to drive the display section, that is, controls to drive the display apparatus (the EVF 31 or the back monitor 32) via the display driving section 18 and performs processing for displaying the predetermined index "⊙" on the display screen of the display apparatus. The predetermined index "⊙" is indication for instructing the operator to perform the 2nd release operation (the second operation). Thereafter, the control section 20 proceeds to processing in the next step S113.

That is, before the predetermined index "⊙" is displayed on the display apparatus in the processing in step S112, the control section 20 confirms the shutter button operation in the processing in steps S109 to Sill. When the shutter button is pushed in before the predetermined index "⊙" is displayed, that is, when the 2nd release operation is performed, the control section 20 returns to the processing in step S102 and performs the time lag measurement processing again from the beginning.

In step S113 in FIG. 13, the control section 20 starts timer clocking processing. The timer clocking processing is processing for measuring a time period from the display of the index "⊙" until the push-in of the shutter button (until the 2nd release operation). At this point, the timer, which is the clocking section, measure a time period from the display of the index "⊙" until the push-in of the shutter button (until the 2nd release operation).

In step S114 in FIG. 13, the control section 20 monitors the operation input section 21 and confirms whether there is an output (an ON signal) of the 2nd release SW 35. If the control section 20 confirms the ON signal of the 2nd release SW 35, the control section 20 proceeds to the processing in step S115. If the control section 20 does not confirm the ON signal of the 2nd release SW 35, the control section 20 repeats the same confirmation processing until confirming the ON signal.

In step S115 in FIG. 13, the control section 20 stops the timer clocking processing. Consequently, the control section 20 measures a time period from the display of the index "⊙" until the push-in of the shutter button (until the output of the 2nd release signal).

In this way, the timer (not shown in the figure) provided on the inside of the control section 20 functions as the measuring section, which is the measuring means, configured to automatically measure a time period until the desired image acquired by the second image pickup section.

In step S116 in FIG. 13, the control section 20 performs processing for setting the number of images (a number-of-frames setting value) equivalent to the release time lag on the basis of measurement time data measured in the processing in steps S113 to S115 and registering (saving) the number of images, for example, in a predetermined storage region of the internal memory 23. In this case, for example, the internal memory 23 functions as the measurement-result storing section, which is the measurement-result storing means. Consequently, the control section 20 may select, out of the plurality of images picked up by the first image pickup section, an image retroactively by a time period or the number of frames equivalent to the release time lag from a picked-up image immediately after the 2nd release ON or a last image by the 1st release and display the image on the display screen of the display apparatus (the EVF 31 or the back monitor 32). In that case, the control section 20 controls to drive the display apparatus (the EVF 31 or the back monitor 32) via the display driving section 18 to perform the display of the image.

The 1st release signal and the 2nd release signal are not always generated at timing between picked-up frames. Therefore, in setting the number-of-frames setting value, the control section 20 only has to set the number-of-frames setting value according to the numbers of frames near respective signal generation timings. Thereafter, the control section 20 ends the series of processing and returns to the original sequence.

Note that, in the example shown in FIG. 13, the time lag measurement processing is the processing for performing the measurement of the release time lag only once and determining and setting the release time lag (the number-of-frames setting value). However, the time lag measurement processing is not limited to this. The time lag measurement processing may be processing for repeating the same measurement processing a plurality of times. An averaged numerical value of the processing may be set as the number-of-frames setting value of the release time lag.

Similarly, among a plurality of setting values acquired by plurality times of the measurement processing, a setting value between a maximum value (MAX) and a minimum value (MIN) may be adopted. Further, in that case, in addition to a determined number-of-frames setting values, setting values of pluralities of images before and after the number-of-frames setting value may be recorded.

With this configuration, the image pickup apparatus 1 according to the present embodiment measures release time lags caused by the apparatus and the user in advance and perform the image recording processing during the image pickup operation taking into account a result of the measurement. Therefore, the user can always easily acquire a desired image simply by performing normal operation without being aware of the release time lags.

Note that, concerning the respective processing sequences explained in the embodiment, a change of the procedures can be allowed as long as the change is not contrary to characteristics of the processing sequences. Therefore, concerning the processing sequences, for example, execution order of the respective processing sequences may be changed, a plurality of processing steps may be simultaneously executed, or order of the respective processing steps may be differentiated every time the series of processing sequences is executed. That is, even if the operation flows in the claims, the specification, and the drawings are explained using "first", "next", and the like for convenience, this does not mean that it is essential to implement the operation flows in this order. It goes without saying that portions not affecting the essence of the invention in the respective steps configuring the operation flows can be omitted as appropriate.

Among the techniques explained above, most of the control and the functions mainly explained in the flowcharts often can be set by a software program. A computer can realize the control and the functions by reading and executing the software program. The software program is electronic data, the entire or a part of which is stored or recorded as a computer program product, in a product manufacturing process in advance, in the storage medium, the storing section, and the like, more specifically, a portable medium such as a flexible disk, a CD-ROM, or a nonvolatile memory or a storage medium such as a hard disk or a volatile memory. Separately from this, the software program can be circulated or provided during product shipment or via a portable medium or a communication line. Even after the product shipment, the user can download the software program and install the software program in a computer via a communication network, the Internet, or the like by himself or herself or install the software program in the computer from a storage medium to enable the software program to operate. Consequently, it is possible to easily realize the image pickup apparatus according to the present embodiment.

The present invention is not limited to the embodiment explained above. It goes without saying that various modifications and applications can be implemented within a range not departing from the spirit of the invention. Further, inventions in various stages are included in the embodiment. Various inventions can be extracted according to appropriate combinations in the disclosed plurality of constituent elements. For example, when the problems to be solved by the invention can be solved and the effects of the invention can be acquired even if several constituent elements are deleted from all the constituent elements described in the embodiment, a configuration from which the constituent elements are deleted can be extracted as an invention. Further, the constituent elements described in different embodiments may be combined as appropriate. The present invention is not limited by specific implementation forms of the present invention except that the present invention is limited by the appended claims.

The present invention is not limited to an image pickup apparatus specialized for an image pickup function. The present invention can be widely applied to electronic apparatuses of other forms, for example, various electronic apparatuses with the image pickup function such as a digital camera, a movie camera, a cellular phone, a smartphone, an electronic notebook, an electronic dictionary, a portable information terminal, a personal computer, a tablet terminal apparatus, a game apparatus, a television receiver, a clock, and a navigation apparatus that makes use of a GPS (Global Positioning System).

Besides picked-up image observation and recording apparatuses and the like for industrial use or medical use such as an endoscope and a microscope, the present invention can also be applied to image pickup apparatuses such as a monitoring camera and a vehicle mounted camera.

What is claimed is:

1. An image pickup apparatus comprising:
a switch configured to output a first signal according to first operation by an operator and output a second signal according to a further second operation following the first operation;
an imager configured to continue to receive the first signal and continuously perform image pickup of a plurality of images until receiving the second signal, as first image pickup and configured to receive the second signal outputted according to the second operation and perform image pickup, as second image pickup, following the first image pickup;
a processor configured to select, out of the plurality of images picked up by the first image pickup, a desired image different from an image immediately after the reception of the second signal among images picked up by the second image pickup and configured to measure a time period or a number of images from the image immediately after the reception of the second signal to the desired image.

2. The image pickup apparatus according to claim 1, further comprising a display configured display one image among the plurality of images acquired by the first image pickup from a first picked-up image by the second image pickup retroactively by the measured time period or the number of images.

3. An image pickup apparatus comprising:
a switch configured to output a first signal according to first operation by an operator and output a second signal according to a further second operation following the first operation;
a display configured to perform display for instructing the operator to perform operation on the switch; and
a processor configured to perform clocking from a start of the display by the display to a point in time when the switch is operated;
an imager configured to continue to receive the first signal and continuously perform image pickup of a plurality of images until receiving the second signal, as first image pickup and configured to receive the second signal outputted by the second operation and perform image pickup, as second image pickup, following the first image pickup, wherein the display is configured to display one image among the plurality of images acquired by the first image pickup from a first picked-up image by the second image pickup retroactively by the measured time period or the number of images.

4. The image pickup apparatus according to claim 3, wherein the display is configured to perform display for instructing the operator to perform the second operation.

5. An image pickup apparatus comprising:
a switch configured to output a first signal according to first operation by an operator and output a second signal according to a further second operation following the first operation;
an imager configured to continue to receive the first signal and continuously perform image pickup of a plurality of images until receiving the second signal, as first image pickup and configured to receive the second signal and perform image pickup of at least a single image, as second image pickup;
a processor with which the operator selects a desired image out of the plurality of images picked up by the first image pickup, the processor being configured to retroactively measure a time period or a number of images from the image acquired by the second image pickup to the selected desired image;
a memory configured to store a result acquired by the processor;
and
a display configured to automatically select a predetermined image on the basis of a measurement result acquired by the processor and display the selected image.

6. An image pickup apparatus comprising:
switch configured to output a first signal according to first operation by an operator and output a second signal according to a further second operation by the operator following the first operation;

an imager configured to continue to receive the first signal and continuously perform image pickup of a plurality of images until receiving the second signal, as first image pickup and configured to receive the second signal outputted according to the second operation for acquiring a desired image and perform image pickup of at least a single image, as second image pickup;

a processor configured to, in order to measure a delay of operation with respect to the second operation for acquiring the desired image, perform first display for urging preparation operation, perform second display for instructing the second operation for not performing image pickup, when the second operation is performed, measure a time period from the second display to the second operation, and store the measured time period; and a display configured to to pick up a plurality of images by the first image pickup, perform image pickup by the second image pickup, and display an image retroactive in a direction of a first image of the plurality of images picked up by the first image pickup from a second image picked up according to a start of the image pickup by the second image pickup by the time period measured by the processor or a number of picked-up images equivalent to the measured time period.

7. The image pickup apparatus according to claim 6, wherein the image pickup apparatus has an operation delay measurement mode for causing only processor to act and an image-pickup-before-and-after-regular-image mode for not causing the operation delay measurement mode to act and causing the imager to act, and either one mode can be selected.

8. The image pickup apparatus according to claim 5, wherein the image pickup apparatus continuously picks up a plurality of images with the second image pickup.

9. The image pickup apparatus according to claim 5, further comprising a memory configured to perform temporary saving of an image, wherein the first image pickup is capable of continuously picking up picked-up images and regularly records a plurality of images in a storage medium from most recent images when images are picked up exceeding a storage capacity of the memory.

10. The image pickup apparatus according to claim 6, wherein the second image pickup is capable of continuously picking up a plurality of picked-up images and, every time an image is picked up, displays the picked-up image on the display and displays a black image between an image displayed and a next image.

11. The image pickup apparatus according to claim 9, wherein the second image pickup is capable of continuously picking up a plurality of picked-up images and, every time an image is picked up, displays the picked-up image on the display and displays a black image between an image displayed and a next image.

12. The image pickup apparatus according to claim 11, wherein a picked-up image in which the black image is displayed beforehand is saved in the memory, the saved image is regularly recorded, and a picked-up image in which the black image is not displayed beforehand is not regularly recorded.

13. The image pickup apparatus according to claim 12, wherein the display of the black image is not performed when an image cannot be saved in the memory.

14. An image pickup method of an image pickup apparatus comprising:
outputting a first signal according to first operation by an operator;
outputting a second signal according to a further second operation following the first operation;
continuing to receive the first signal and continuously performing image pickup of a plurality of images until the second signal is received;
receiving the second signal outputted according to the second operation and performing image pickup following the image pickup;
selecting, out of the plurality of images picked up according to the first signal, a desired image different from an image immediately after the reception of the second signal among the images picked up; and
measuring a time period or a number of images from the image immediately after the reception of the second image to the desired image.

15. The image pickup method of the image pickup apparatus according to claim 14, further comprising making one image be displayed among the plurality of images acquired retroactively by the measured time period or the number of images.

16. An image pickup method of the image pickup apparatus comprising:
receiving first operation by an operator on a switch and outputting a first signal according to the first operation;
outputting a second signal according to a further second operation by the operator following the first operation;
performing display for instructing the operator to perform operation on the switch;
performing clocking from a start of the display to a point in time when the switch is operated;
continuing to receive the first signal and continuously performing image pickup of a plurality of images until the second signal is received;
receiving the second signal and performing image pickup; and
making one image be displayed among the plurality of images acquired according to the first signal from a first picked-up image acquired according to the second signal retroactively by the measured time period or the number of images.

17. The image pickup method of the image pickup apparatus according to claim 16, further comprising:
performing display for instructing the operator to perform the second operation.

18. An image pickup method of an image pickup apparatus comprising:
outputting a first signal according to first operation by an operator and outputting a second signal according to a further second operation following the first operation;
continuing to receive the first signal and continuously performing image pickup of a plurality of images until the second signal is received;
receiving the second signal and performing image pickup of at least a single image;
the operator selecting a desired image out of the plurality of images acquired by receiving the first signal;
retroactively measuring a time period or a number of images from the single image acquired by receiving the second signal to the selected desired image;
storing the time period or the number of images;
automatically selecting a desired image on the basis of the time period or the number of images; and making the selected image be displayed.

19. An image pickup method of an image pickup apparatus comprising:
- outputting a first signal according to first operation by an operator on a switch;
- outputting a second signal according to a further second operation by the operator on the switch following the first operation;
- continuing to receive the first signal and continuously performing image pickup of a plurality of images until the second signal is received;
- receiving the second signal outputted according to the second operation for acquiring a desired image and performing image pickup of at least a single image;
- in order to measure a delay of operation on the switch with respect to the second operation for acquiring the desired image, performing first display for urging preparation operation on the switch;
- performing second display for instructing the second operation for not performing image pickup;
- when the second operation is performed, measuring a time period from the second display to the second operation;
- storing the measured time period; and
- receiving the first signal, starting image pickup of a plurality of images, and displaying an image retroactive in a direction of a first image of the plurality of images from a second image picked up according to the second signal by the measured time period or a number of picked-up images equivalent to the measured time period.

* * * * *